(12) United States Patent
Vander Mey

(10) Patent No.: US 10,046,853 B2
(45) Date of Patent: Aug. 14, 2018

(54) HYBRID GYRODYNE AIRCRAFT EMPLOYING A MANAGED AUTOROTATION FLIGHT CONTROL SYSTEM

(71) Applicant: Aergility LLC, Dunnellon, FL (US)

(72) Inventor: James E. Vander Mey, Dunnellon, FL (US)

(73) Assignee: AERGILITY LLC, Dunnellon, FL (US)

( * ) Notice: Subject to any disclaimer, the term of this patent is extended or adjusted under 35 U.S.C. 154(b) by 292 days.

(21) Appl. No.: 14/827,614

(22) Filed: Aug. 17, 2015

(65) Prior Publication Data

US 2016/0052626 A1    Feb. 25, 2016

Related U.S. Application Data

(60) Provisional application No. 62/039,139, filed on Aug. 19, 2014.

(51) Int. Cl.
| | |
|---|---|
| *B64C 27/08* | (2006.01) |
| *B64C 27/02* | (2006.01) |
| *B64C 27/20* | (2006.01) |
| *B64C 37/00* | (2006.01) |
| *B64C 27/54* | (2006.01) |

(Continued)

(52) U.S. Cl.
CPC .............. *B64C 27/08* (2013.01); *B64C 27/02* (2013.01); *B64C 27/20* (2013.01); *B64C 37/00* (2013.01); *B64C 2027/8236* (2013.01); *B64D 2027/026* (2013.01); *Y02T 50/64* (2013.01)

(58) Field of Classification Search
CPC ....... B64C 27/08; B64C 27/025; B64C 27/02; B64C 29/0025; B64C 2201/066
See application file for complete search history.

(56) References Cited

U.S. PATENT DOCUMENTS 3,618,875 A * 11/1971 Kappus ............... B64C 29/0025
  244/12.3
5,727,754 A    3/1998 Carter, Jr.
(Continued)

FOREIGN PATENT DOCUMENTS

| CN | 102360218 | 2/2012 |
|---|---|---|
| CN | 102514711 | 6/2012 |

(Continued)

*Primary Examiner* — Medhat Badawi
*Assistant Examiner* — Christopher D Hutchens
(74) *Attorney, Agent, or Firm* — Occhiuti & Rohlicek LLP

(57) ABSTRACT

An aircraft includes at least one propulsion engine, coupled to a fuselage, and configured to provide forward thrust to propel the aircraft along a first vector during forward flight. Each of at least two of multiple rotors coupled to the fuselage is coupled to a motor configured to supply power to that rotor and/or to draw power from that rotor. At least two of the rotors are configured to operate during forward flight to provide at least some lift to the aircraft along a second vector. A flight control system is configured to control the rotors that are configured to operate during forward flight in a power managed regime in which a net electrical power, consisting of the sum of the power being supplied to or drawn from each rotor by its motor, is maintained within a range determined by a feedback control system of the flight control system.

61 Claims, 12 Drawing Sheets

(51) Int. Cl.
  *B64D 45/00* (2006.01)
  *B64C 27/22* (2006.01)
  *B64C 27/82* (2006.01)
  *B64D 27/02* (2006.01)

(56) References Cited

U.S. PATENT DOCUMENTS

| | | | |
|---|---|---|---|
| 6,886,776 B2 * | 5/2005 | Wagner | B64C 3/56 244/12.1 |
| 8,393,465 B2 | 3/2013 | Kroo | |
| 8,453,962 B2 | 6/2013 | Shaw | |
| 8,485,464 B2 | 7/2013 | Kroo | |
| 9,120,560 B1 * | 9/2015 | Armer | B64C 29/0008 |
| 9,527,588 B1 * | 12/2016 | Rollefstad | B64C 39/024 |
| 2002/0195518 A1 * | 12/2002 | Killingsworth | B60F 3/00 244/7 A |
| 2004/0245374 A1 * | 12/2004 | Morgan | B64C 29/0025 244/12.3 |
| 2006/0266881 A1 | 11/2006 | Hughey | |
| 2008/0169375 A1 * | 7/2008 | Ishikawa | B64C 29/0025 244/12.1 |
| 2009/0008499 A1 * | 1/2009 | Shaw | B64C 27/20 244/17.23 |
| 2009/0145998 A1 * | 6/2009 | Salyer | B64C 27/04 244/17.23 |
| 2010/0044499 A1 * | 2/2010 | Dragan | B64C 1/30 244/17.23 |
| 2012/0068006 A1 * | 3/2012 | Jones | B64C 27/025 244/17.15 |
| 2012/0091259 A1 | 4/2012 | Morris et al. | |
| 2012/0168568 A1 | 7/2012 | Sonneborn | |
| 2013/0049364 A1 | 2/2013 | Teets et al. | |
| 2013/0062455 A1 | 3/2013 | Lugg et al. | |
| 2013/0092799 A1 * | 4/2013 | Tian | B64C 27/26 244/7 R |
| 2013/0214086 A1 | 8/2013 | Kroo | |
| 2014/0034774 A1 | 2/2014 | Ferrier et al. | |
| 2014/0061366 A1 | 3/2014 | Fink et al. | |
| 2014/0097290 A1 * | 4/2014 | Leng | B64C 29/0025 244/6 |
| 2014/0158815 A1 * | 6/2014 | Renteria | B64C 29/0025 244/12.1 |
| 2015/0012154 A1 * | 1/2015 | Senkel | B64D 17/80 701/4 |
| 2015/0115108 A1 * | 4/2015 | Benson | B60L 11/1809 244/53 R |
| 2016/0023751 A1 * | 1/2016 | Lee | B64C 27/021 701/2 |
| 2016/0052618 A1 * | 2/2016 | Norden | B64C 29/0025 244/7 C |
| 2016/0207625 A1 * | 7/2016 | Judas | B64C 29/0025 |

FOREIGN PATENT DOCUMENTS

| | | |
|---|---|---|
| DE | 102005010336 | 5/2006 |
| DE | 102006021182 | 11/2007 |
| DE | 102012202698 | 8/2013 |
| GB | 2468787 | 9/2010 |
| GB | 2498406 | 2/2014 |
| JP | 3677748 | 8/2005 |
| KR | 2014-0034370 | 3/2014 |
| WO | 2014/053057 | 4/2004 |
| WO | 2008/147484 | 12/2008 |
| WO | 2011/140551 | 11/2011 |
| WO | 2013/124300 | 8/2013 |

\* cited by examiner

HYBRID GYRODYNE AIRCRAFT EMPLOYING A MANAGED AUTOROTATION FLIGHT CONTROL SYSTEM

CROSS-REFERENCE TO RELATED APPLICATIONS

This application claims the benefit of U.S. Provisional Application No. 62/039,139 filed Aug. 19, 2014, incorporated herein by reference.

BACKGROUND

This description relates to a class of aircraft that use rotary wings (rotors) for lift such as a helicopter/multicopter, gyrocopter or gyrodyne aircraft.

A gyrodyne aircraft consists of a fuselage with one or more propulsion power sources (ICE jet/propeller), one or more rotors that provide additional powered lift during vertical takeoff and landing and often fixed wings and/or standard aircraft control surfaces for normal cruise flight. These rotors are basically unpowered during the balance of the flight and may be the sole lifting surfaces by autorotation, be used to augment the lift of other winged surfaces or be slowed to reduce drag while relying mostly/solely on the lift of other winged surfaces. Autorotation is an aerodynamic state of a rotor where the only power applied to the rotor is from the airflow through the rotor, which provides the rotational power, and the resulting rotation of the blades provides lift.

The purported advantage of a gyrodyne versus a helicopter is to provide a less complex vertical lifting system generally not requiring the expensive variable pitch rotors and complex maintenance-prone swash plate for collective and pitch control while providing a higher cruise speed. Higher cruise speed is accomplished by using separate dedicated propulsion engines with reduced drag by relying on other wing surfaces and/or reduced RPM of rotor surfaces.

While any number of rotors can be used in a gyrodyne, historically it has been just one rotor. Gyrodynes that use one rotor do not typically require a compensating torque device such as the tail rotors found on helicopters because torque is not applied between the aircraft and the rotor in flight. For example, ram jets on the wing tips were used on the 1950-60's Fairley Rotodyne and similarly tip jets in the early 2000's DARPA-Groen Brothers Heliplane project. The Carter Copter uses a high inertia rotor at a flat (no lift) pitch spun up on the ground (due to friction with the ground the applied torque will not spin the aircraft. Then the spin force (torque) is disconnected, the pitch is quickly increased resulting in a high "jump takeoff" lift for a short period of time while the aircraft transitions to forward flight. For landing, the rotor is set to high RPM by autorotation during the approach and the inertia of the rotor provides enough energy to provide a pitch controlled soft/vertical landing.

Autorotation is also used to provide lift as an emergency landing method for helicopters in the event of power failure to the rotor(s).

SUMMARY

In one aspect, in general, an aircraft includes: a fuselage; at least one propulsion engine coupled to the fuselage, wherein the propulsion engine is configured to provide forward thrust to propel the aircraft along a first vector during forward flight; a plurality of rotors coupled to the fuselage, wherein each rotor of at least two of the plurality of rotors is coupled to a motor configured to supply power to that rotor, or configured to draw power from that rotor, or configured to supply power to that rotor and configured to draw power from that rotor, and at least two of the plurality of rotors are configured to operate during forward flight to provide at least some lift to the aircraft along a second vector; and a flight control system configured to control the rotors that are configured to operate during forward flight in a power managed regime in which a net electrical power, consisting of the sum of the power being supplied to or drawn from each rotor by its motor, is maintained within a range determined by a feedback control system of the flight control system.

Aspects can include one or more of the following features.

All of the plurality of rotors that are configured to operate during forward flight are collectively configured to provide attitude control for the aircraft.

The attitude control is provided by supplying power to or drawing power from each of the plurality of rotors that are configured to operate during forward flight under control of the flight control system.

The attitude control is provided by (1) supplying power to at least one of the plurality of rotors from its motor, and (2) drawing power from at least one of the plurality of rotors to its motor.

The plurality of rotors includes at least four rotors.

The flight control system is configured for unmanned operation.

The net electrical power drawn from the rotors is maintained within a range for charging one or more batteries in the power managed regime.

The net electrical power drawn from the rotors is used to replenish the electrical power supplied by the one or more batteries for vertical takeoff or vertical landing.

The net electrical power is maintained such that the average net electrical power over a time interval is zero.

The net electrical power and the aircraft attitude are collectively maintained during forward flight in the power managed regime to increase a value of at least one characteristic relative to its value outside of the power managed regime, where the characteristic is selected from the group consisting of: (1) a fuel efficiency of the aircraft, (2) a forward speed along the first vector relative to the fuel efficiency of the aircraft, and (3) the forward speed along the first vector when the average net electrical power is maintained such that the average net electrical power over a time interval is zero.

At least one electrical generator powered by the at least one propulsion engine provides the net electrical power necessary to operate at the increased fuel efficiency or the increased forward speed.

The rotors are fixed pitch.

The power being supplied to or drawn from each rotor by its motor adjusts a rotation frequency of the rotor to provide attitude control.

The flight control system imposes limits on the minimum and maximum average rotation frequency of the rotors to provide headroom for configuring the rotation frequency of each rotor for attitude control.

The rotors have variable pitch.

The power being supplied to or drawn from each rotor by its motor is managed by increasing or decreasing a blade pitch of each rotor to provide attitude control.

The rotors vary in pitch as a function of angular position.

The flight control system provides at least three axes of attitude control, including: a pitch axis, a roll axis, and a yaw axis.

User input to the flight control system includes one or more of heading turn rate, vertical rate of change, and forward or reverse speed, and the flight control system manages the propulsion power and the attitude of the aircraft within predetermined safe operating flight regions of the aircraft and based on the user input.

In response to user input to change heading, the flight control system predominantly uses the yaw axis to change heading and use the pitch axis to prevent slip when below a low forward speed threshold, and predominantly uses the roll axis to change heading and uses the yaw axis to prevent slip when above a high forward speed threshold, and uses a combination of the yaw axis and the roll axis to change heading and prevent slip when the forward speed is between the low forward speed threshold and the high forward speed threshold.

In response to an additional user input to the flight control system to change altitude, the flight control system predominantly uses the net electrical power to the rotors to change altitude when below a low forward speed threshold, and predominantly uses the pitch axis to change altitude when above a high forward speed threshold, and uses a combination of the net electrical power to the rotors and the pitch axis to change altitude when the forward speed is between the low forward speed threshold and the high forward speed threshold.

The flight control system returns the aircraft to straight and level flight at a constant speed when there is no user input to the flight control system, regardless of the current aircraft orientation or speed.

An additional user input to the flight control system provides for lateral direction control during vertical takeoff or landing or slip control during forward flight.

A fixed rudder fin provides additional yaw stability in forward flight.

A rudder provides additional yaw control in forward flight.

The rudder provides yaw control upon the failure of one or more of the rotors.

An elevator or elevons provide pitch control upon the failure of one or more of the rotors.

The flight control system continues to provide attitude control upon the failure of one or more of the rotors by collectively managing the electrical power to each rotor by its motor to compensate for the failed rotor or rotors.

A rudder and an elevator provide attitude control upon a failure of an electrical system that provides electrical power to each rotor by its motor, or a failure of the flight control system.

The flight control system notifies a user of the failure for the purpose of initiating a safe landing.

The flight control system notifies the user if a vertical landing is possible as a result of the failure or if a landing with forward speed is required.

There are a plurality of flight control systems, each individually capable of providing attitude control and each having the ability to make a safe landing upon failure of at least one of: a rotor, the propulsion engine, the flight control system, one or more electrical systems that supply power to or draw power from each rotor by its motor, or one or more batteries.

Attitude control and the ability to make a safe landing in forward flight is maintained after a failure of all batteries wherein electrical power for the flight control system is supplied by the rotors by their motors.

Two motors are coupled to each rotor that is configured to operate during forward flight, and a first electrical system is configured to supply power to or draw power from each rotor by a first of its two motors, and a second electrical system is configured to supply power to or draw power from each rotor by a second of its two motors, and the flight control system manages power supplied to or drawn from all of the plurality of rotors that are configured to operate during forward flight through either or both of the electrical systems to provide attitude control for the aircraft.

Prior to takeoff of the aircraft, the flight control system uses input from at least one sensor to determine atmospheric conditions and/or the aircraft weight and balance, and to configure the plurality of rotors for level takeoff.

A structure supporting the plurality of rotors is configured to fold such that the resulting overall size of the aircraft is sufficiently small in size to drive directly on a public road or to be towed on a trailer over a public road.

At least two of the plurality of rotors are used for vertical takeoff or vertical landing.

At least one battery provides electrical power for vertical takeoff or vertical landing.

At least one electrical generator powered by the at least propulsion engine provides at least a portion of the electrical power for vertical takeoff or vertical landing.

Either (1) the net electrical power is negative such that a total electrical power drawn from one or more rotors is greater than a total electrical power supplied to any rotors; or (2) the net electrical power is positive such that a total electrical power supplied to one or more rotors is greater than a total electrical power drawn from any rotors, and the net electrical power is less than an airflow power supplied to the plurality of rotors from air flow through the rotors due to forward thrust.

The first vector is substantially perpendicular to a force of gravity acting on the aircraft.

The second vector is substantially parallel to the force of gravity acting on the aircraft.

The aircraft further includes at least one pair of wings coupled to the fuselage and configured to provide at least some lift to the aircraft along the second vector.

In another aspect, in general, a method for operating an aircraft includes: operating at least one propulsion engine coupled to a fuselage to provide forward thrust to propel the aircraft along a first vector during forward flight; operating a plurality of rotors coupled to the fuselage, wherein each rotor of at least two of the plurality of rotors is coupled to a motor configured to supply power to that rotor, or configured to draw power from that rotor, or configured to supply power to that rotor and configured to draw power from that rotor, and at least two of the plurality of rotors are configured to operate during forward flight to provide at least some lift to the aircraft along a second vector; and operating a flight control system to control the rotors that are configured to operate during forward flight in a power managed regime in which a net electrical power, consisting of the sum of the power being supplied to or drawn from each rotor by its motor, is maintained within a range determined by a feedback control system of the flight control system.

In another aspect, in general, a gyrodyne VTOL-capable aircraft uses: one or more standard internal combustion engines to directly or indirectly (e.g. using a generator/motor) provide thrust for forward flight, and rotors powered by electric motor/generators for lift during takeoff and landing and that operate in managed autorotation during the balance of the flight, or when the flight control system is controlling the rotors in a power managed regime. In managed autorotation, the state of each rotor is varied as necessary for flight control between operating where electrical power is applied (by a motor) to the rotor shaft to supplement the rotational power from the airflow through the rotors (or airflow power), and operating where electrical power is drawn (by the motor) from the rotor shaft to consume some of the airflow power applied to rotor. In some embodiments, each of the rotors is a fixed pitch, low inertia rotor (e.g., inertia low enough to enable use of dynamic changes in rotation frequency for attitude control). In some embodiments, each rotor shaft is also fixed in position relative to the aircraft.

Aspects can have one or more of the following advantages.

Peak energy from a small battery store and/or on-board generator is used for a short time (~20 seconds) during vertical takeoff and landing to power the rotors in helicopter mode (airstream down through the rotors). If desired, any battery store energy can be quickly replenished during forward flight by either an on-board generator or by using net regenerative braking on the rotors during the managed autorotation mode (airstream up through the rotors). During cruise, the flight control system (in the power managed regime) manages the autorotation by incrementing/decrementing power to the rotor shafts such that collectively the rotor motor/generators produce either net positive electrical energy to recharge the battery store, zero net electrical energy if/when the battery does not require a charge, or in the case an on-board generator is present, small net negative electrical energy to the rotor shafts to maximize flight performance parameters such as cruise speed or fuel efficiency. The flight control system does this by adjusting over a period of time the base (collective) rotation frequency (e.g., the average or other collective measurement of the rotation frequencies of the rotors measured in revolutions per minute (RPM)) of all rotors and the aircraft pitch (therefore all the rotor discs pitch) to balance the incremental applied power and/or regenerative braking to achieve the desired net energy value over that time period, or equivalently, the desired net electrical power (i.e., the sum of the power supplied to or drawn from each rotor by its motor). Thus, in the power managed regime, the flight control system controls the net electrical power to be maintained within an operating range determined by an appropriate feedback control system (e.g., using analog feedback control circuitry, or a digital feedback control loop). For example, the operating range may be a range around zero net electrical power, or a range around a desired positive net electrical power (drawn from the rotors for recharging) or a desired negative net electrical power (supplied to the rotors for performance optimization).

The flight control system maintains the desired rpm of the autorotating low inertia rotors to prevent undesired changes as a result of changes in flight attitude. Otherwise a steep climb pitch which would increase the autorotation rpms due to increased airflow and thus increase the lift beyond that anticipated due to normal pitch attitude change, making the aircraft difficult to control. Or a steep descent would decrease the autorotation rpms resulting in loss of lift to the point where flight control could be lost and the rotors could even stop.

With four or more rotors, all necessary flight control functions (pitch, roll, yaw) can be accomplished using differential rpms on select rotors about the base collective rpm by incremental power control of the select rotor motors. While additional flight control surfaces could be used for added stability or control, they are not necessary.

A novel flight control system reduces the pilot workload substantially, automatically stabilizes the aircraft, provides for consistent behavior of the pilot controls over the entire operating region and limits the aircraft to safe operating regions.

The need for collective and yaw controls are eliminated and the remaining two axis controls are redefined as: 1. vertical rate of change (vs pitch) and 2. heading turn rate (vs roll) as well as the forward speed control (throttle). The flight control system determines all necessary collective, pitch, roll and yaw conditions necessary to implement the desired actions, including automatic transition to/from helicopter and managed autorotation modes.

A "hands-off" controls condition returns the aircraft to straight and level at constant speed regardless of current speed or aircraft orientation. Other features include in-flight braking, speed and glide path cruise control, automatic crosswind compensation to name a few.

Because the rotor motors only need a few power wires from a motor controller to drive the phases of a brushless DC motor/generator, a rotor structure can be configured to fold in arbitrary fashion, constrained only by a suitable cable service loop. Or alternately the batteries and motor control can be collocated with the motors with only control and charging wires being needed. This facilitates a compact ground vehicle that can be easily towable/garageable or with the addition of either power transmission from the primary propulsion engine, or electric motor driven wheels, be a driveable roadable vehicle.

In some embodiments, the aircraft is propelled by one or more standard aircraft engines and the light weight rotors operate at reduced RPM/drag in managed autorotation during cruise, and thus the aircraft performance and cruise range is comparable to a standard aircraft. The aircraft is of low complexity with no complex pitch or collective control rotor heads as found on helicopters which avoids cost and weight. In some embodiments, the only moving parts in flight are the spinning electric motor/generator connected to the rotors and the propulsion propeller or other thrust mechanism. The rotors are light weight straight forward propeller-like structures with fixed pitch and should cost substantially less and require less maintenance than high inertia rotors with complex swashplate hubs controlling the required dynamic pitch changes of helicopter type rotorcraft.

DETAILED DESCRIPTION

In order for the electric motors to make the rapid RPM changes necessary for flight control functions (pitch, roll, yaw, collective) the rotors of some embodiments are of low inertia. The rotors have a large relative span to create a large disc area with moderate disc loading like a helicopter or gyroplane rotor. Because of the need for relatively high RPM and high RPM change rate, the rotor disc has a low solidity (the blades have a thin chord) more like a propeller than a rotor. Because the rotors are also at a low fixed pitch and do not incorporate much if any of the pitch twist typically found on propeller, they are in this instance more like gyroplane rotors than propellers. Because they are (semi)rigid, fixed pitch and low inertia, and do not have the hinged, pitch adjustable, high inertia rotors of helicopters they are in this instance more like regular propellers than helicopter or gyroplane rotors. But because they are used primarily for lift as opposed for propulsion and produce thrust with large amounts of slow speed propwash instead of smaller amounts of high speed propwash and are of a very low pitch angle they are more like wings or gyroplane rotors than propellers. To indicate that these rigid, very low inertia, fixed low flat pitch, low solidity blade rotors are really a hybrid of both propellers and normal rotors, they will henceforth be called "protors".

Figure 1:
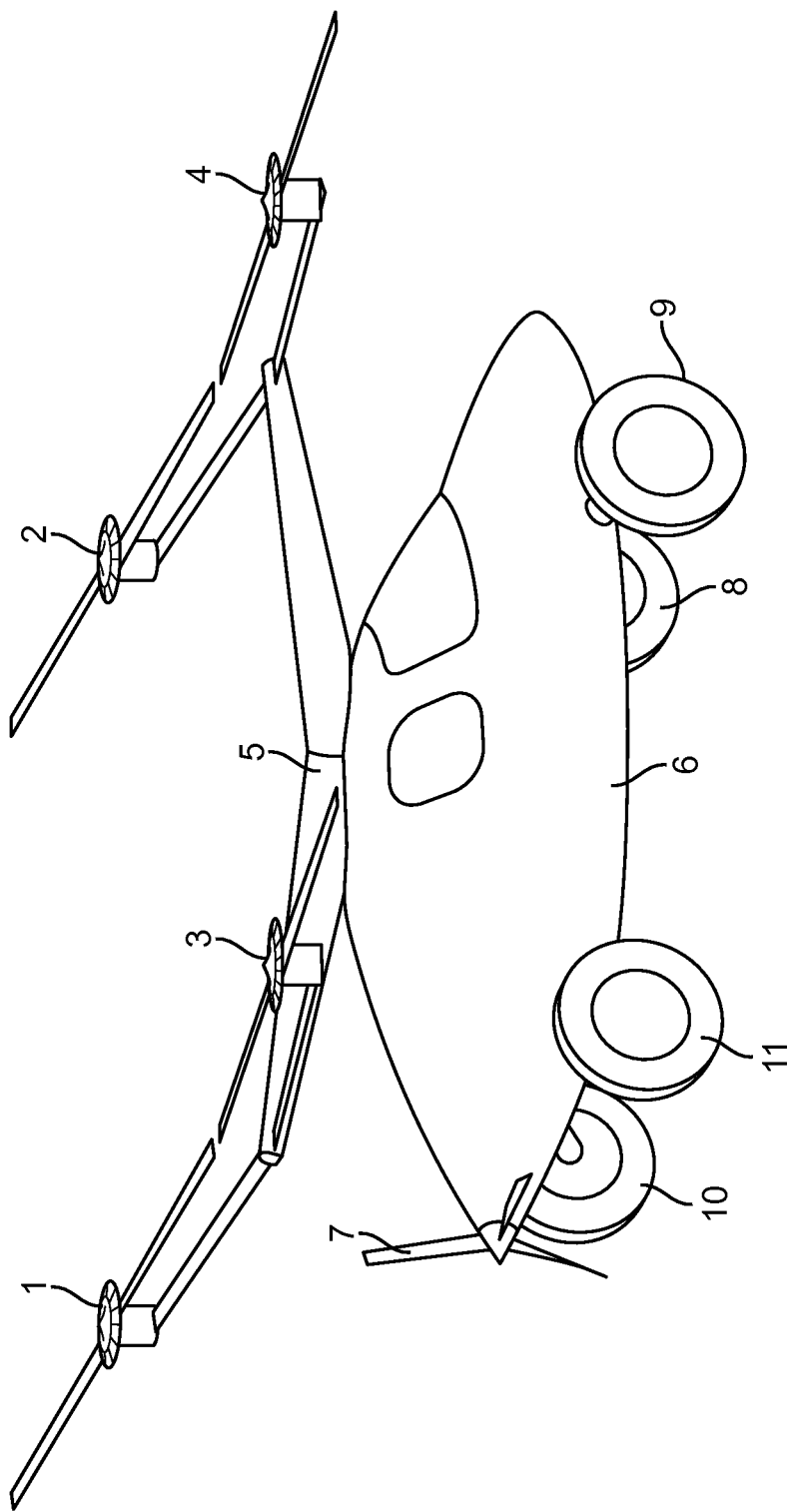
FIG. 1 show an embodiment with four rotors and a pusher propeller.

One embodiment of the hybrid gyrodyne as shown in FIG. 1 consists of four protors 1, 2, 3, 4 driven by electric motor/generators with a supporting structure 5 attached to the top of a fuselage 6 that can hold up to four passengers, a pusher propulsion propeller 7 with and landing gear/ground vehicle wheels 8, 9, 10, 11. With four protors, the aircraft does not require any additional lift or aircraft control surfaces (eg wings, rudders, ailerons, elevators). All flight control can be accomplished by electrical motor control of the RPM of the rotors. The propulsion propeller 7 could be directly connected via a drive train to the ICE engine or driven indirectly by an electric motor if the ICE engine were driving instead a generator of suitable size.

Figure 2:
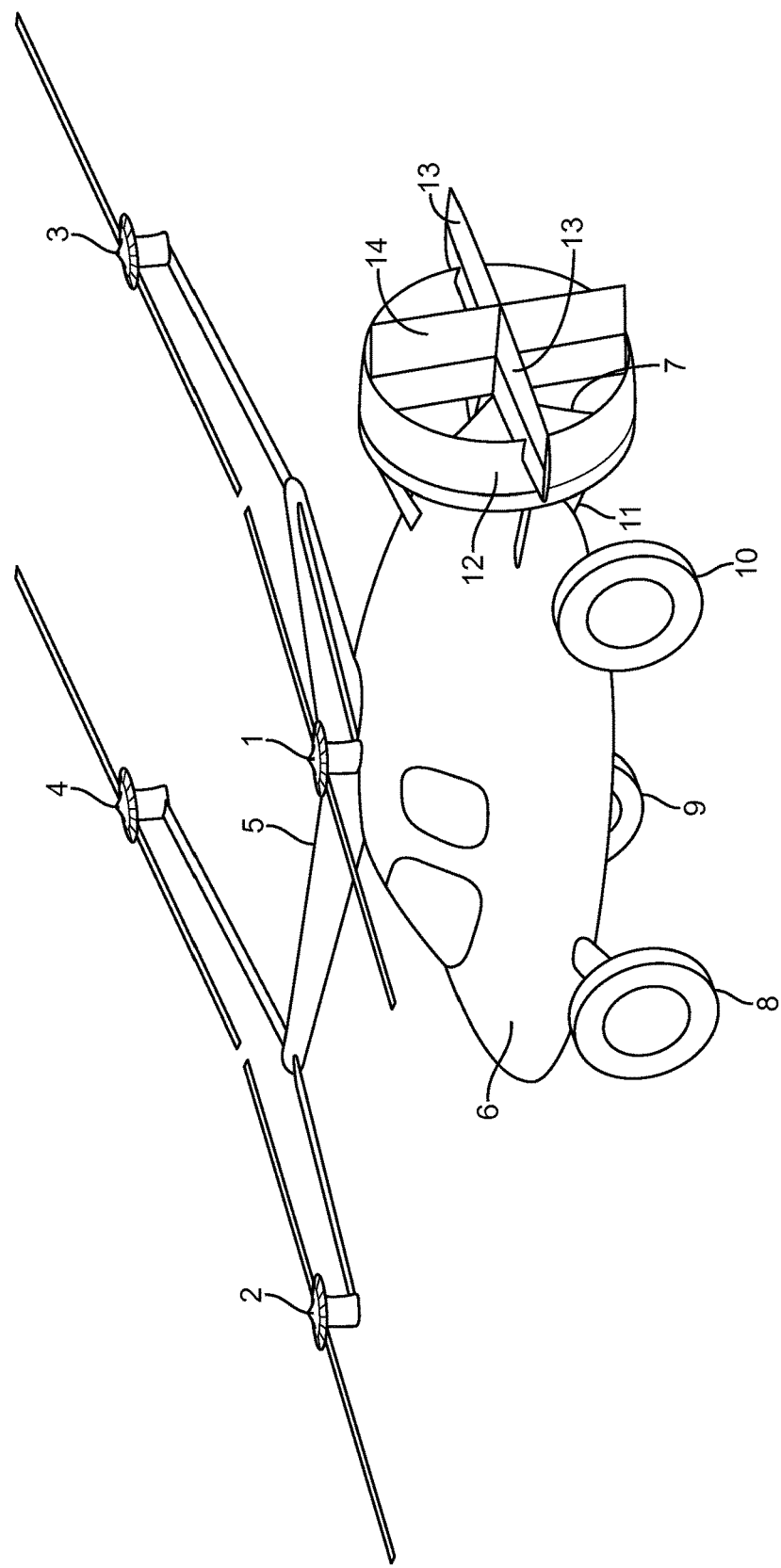
FIG. 2 shows an embodiment with additional tail control surfaces and a ducted propeller.

FIG. 2 shows another embodiment which in addition to the elements of FIG. 1 have a duct 12 that enshrouds the propeller 7 for additional low speed thrust with fixed non-active horizontal 13 and vertical 14 tail surfaces are added to improve stability and provide fixed trim compensation for propeller torque and aircraft cruise trim.

In another embodiment of FIG. 2 the tail control surfaces operate as active elevons 13, and rudder 14 and can be used to augment protor flight control and in an emergency provide sufficient aircraft control where a failure of electrical power to the protors leaves them in uncontrolled autorotation only.

Figure 3:
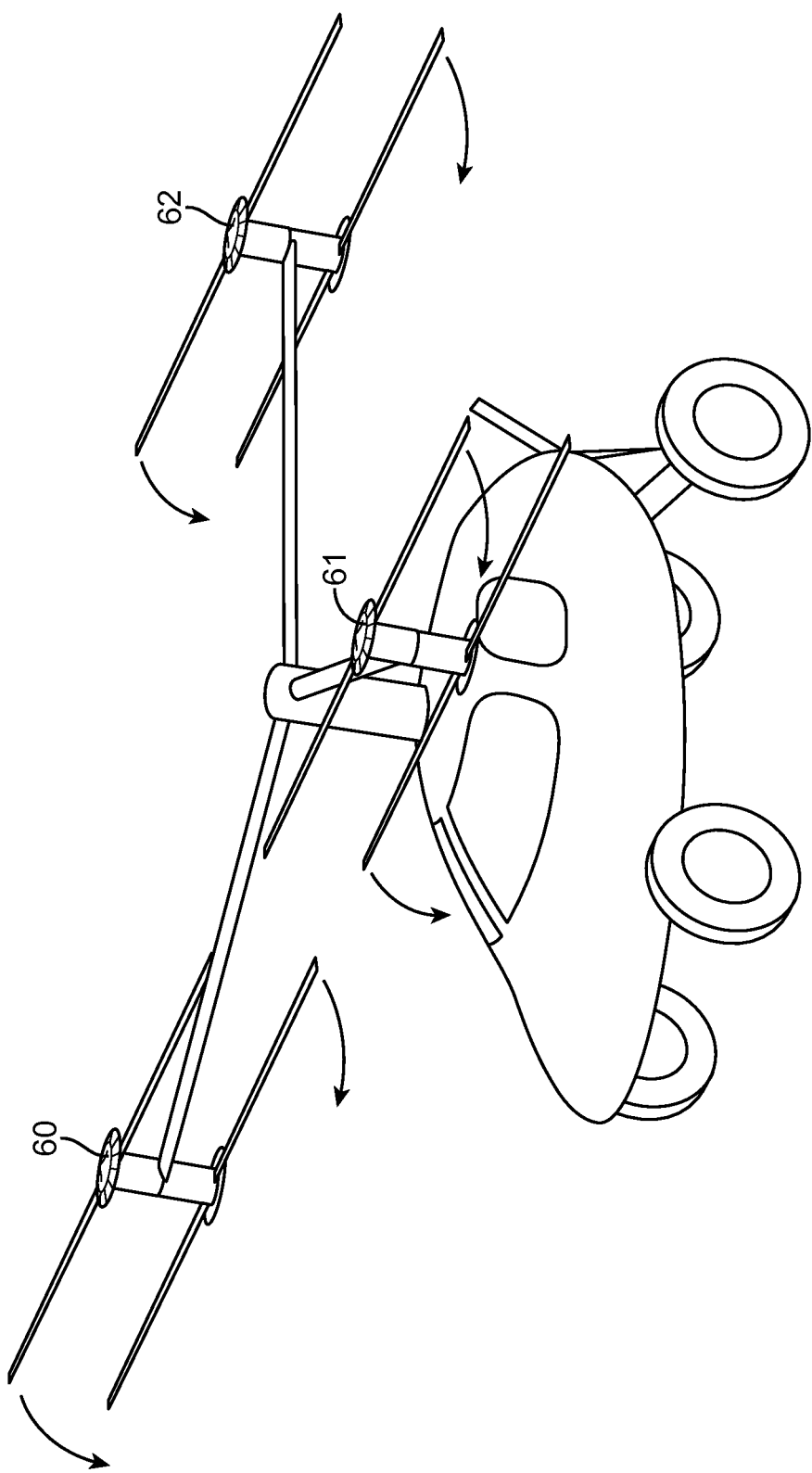
FIG. 3 shows an embodiment with three sets of dual coaxial rotors.

In another embodiment, alternate configurations with more protors are possible allowing for more robust failure modes in the event of protor failures (FIG. 3). The number of protors would in some embodiments be an even number so that counter rotating protors can be paired to eliminate unwanted torque drive on the fuselage. These protors could be configured in counter rotating coaxial pairs as shown in FIG. 3, as overlapping protors, or as non-overlapping protors. The number of pair rotors is an embodiment is arbitrary.

Other embodiments as with other gyrodyne examples given earlier, additional airfoils such as wings 16 (shown in FIG. 4, using dashed lines to indicate an alternative embodiment) can be used for lift during cruise.

An aircraft representing the embodiment of FIG. 2 was developed as a model on an ultrarealistic aircraft simulator (Laminar Research X-Plane V10-Ref. 1). The simulator uses a physical model of the aircraft and then performs aerodynamic calculations on individual elements of the aircraft one at a time using "blade element theory" and known heuristics to arrive at an "ultra-realistic" model of the aerodynamic forces acting on the aircraft at any given point in time. It has been demonstrated that if built as modeled, the aircraft designed on this simulator will fly very close to what the simulator predicts. That process was used in specifying the characteristics and demonstrating the performance of various embodiments.

Table 1 illustrates some of the key operational characteristics and simulated performance of the example embodiment in FIG. 2. The payload, range and speed are comparable to some fixed wing (non-VTOL) aircraft of the same class of payload and engine horsepower.

TABLE 1

Characteristics and Simulated Performance of An Example

Figure 5:
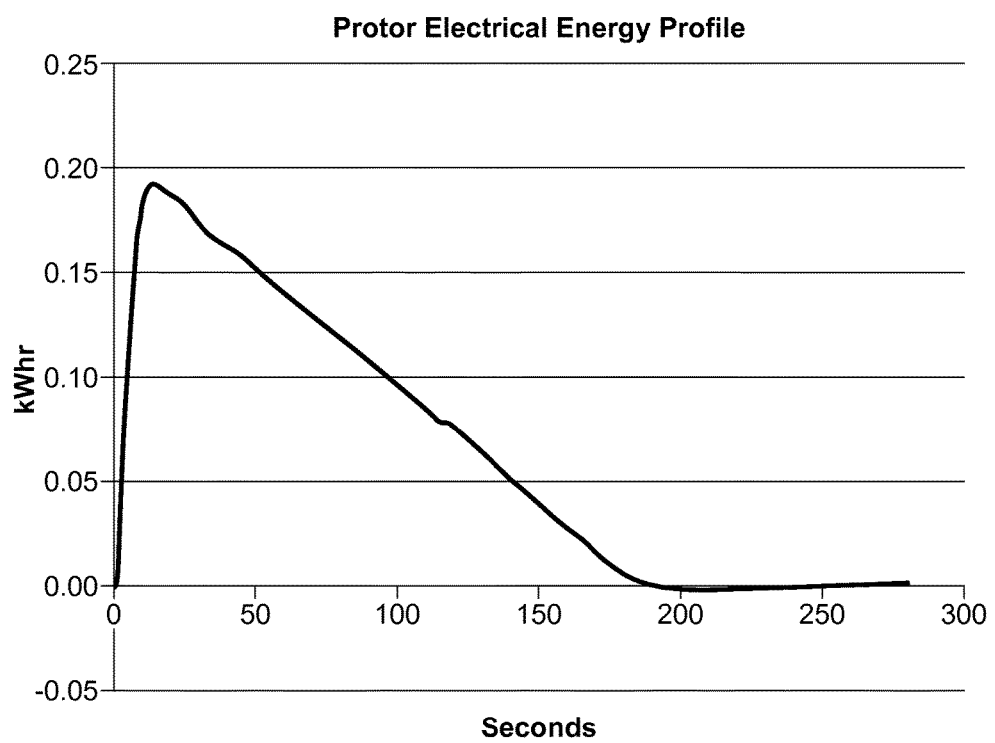
FIG. 5 shows the electrical energy consumption profile over time during normal 'jump' vertical takeoff and subsequent managed autorotation cruise regeneration.
Figure 7:
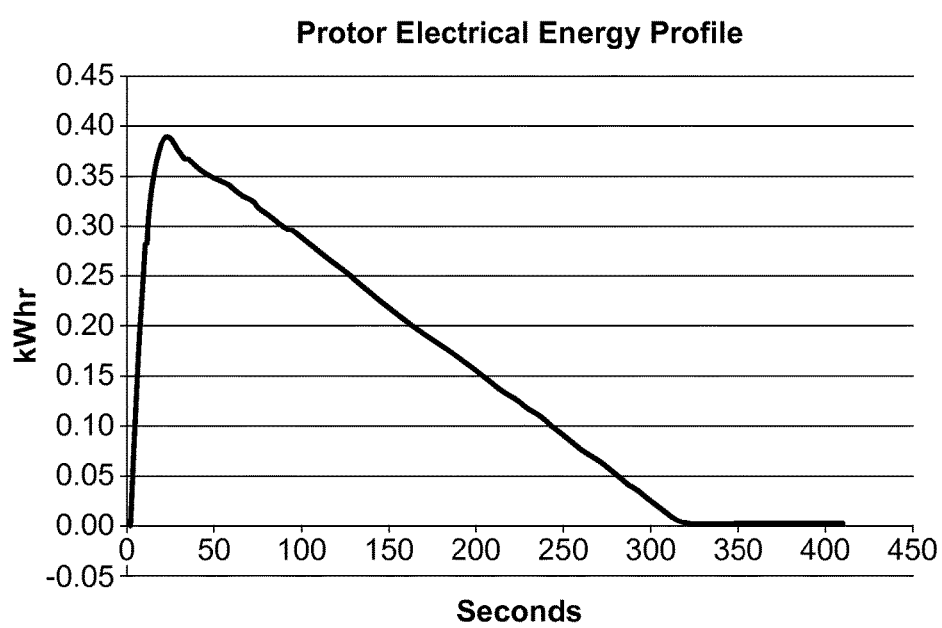
FIG. 7 shows the electrical energy consumption profile over time during a high vertical takeoff (100' AGL) and subsequent managed autorotation cruise regeneration.

Aircraft EW/GW - 1250 lb/2100 lb
Fuel Capacity - 20 gal/120 lb
Useful Load - 850 lb
Rotors (each) - 14' diameter, 5' chord, 4deg pitch, 2 blades per, weight of 2 blades ~6 lbs,
Moment of Inertia ~5.9 kg * $m^2$, max RPM - 1060
Rotor electric motors (per rotor) - 30 kW (40 hp) per rotor, max peak torque - 90 ft-lb,
max RPM - 3500, weight ~15 lb
Electric battery store (total) - specific energy 2 kWh, specific power 90 kW, weight ~25-30 lbs
Propulsion Engine - max power - 190 hp, max RPM - 5000 RPM
Propeller - 3 blade, 5' diameter, max RPM - 2500 RPM
Standard vertical 'jump' takeoff electrical energy consumption - ~0.2 kWh at GW and
std conditions (shown in FIG. 5)
High rise takeoff (100'AGL) electrical energy max consumption - ~0.4 kWh (shown in
FIG. 7)
Standard vertical landing electrical energy consumption at GW - ~0.0 kWh (kinetic
energy recovery during descent approximately equals power to settle to vertical
touchdown.)

TABLE 1-continued

Characteristics and Simulated Performance of An Example

Max Rate of Climb - >3000 fpm with rotor assist. (limited in normal flight control system to ~1000 fpm)
Max speed - ~150 mph
Cruise speed (80-85% pwr) - ~135-140 mph
Range (1/2 hr reserve) - ~3 hr, >400 miles Aircraft Flight Control System An implementation of classical flight control system could be used to fly some embodiments. The primary pilot flight controls could be implemented with a 3 axis joystick in which forward/back represented the pitch axis, side/side represented the roll axis and twist left/right represented the yaw axis. A separate collective control would be used to control the thrust generated by protors for up/down motion. In addition a throttle would be used to control the propulsion engine.

Figure 4:
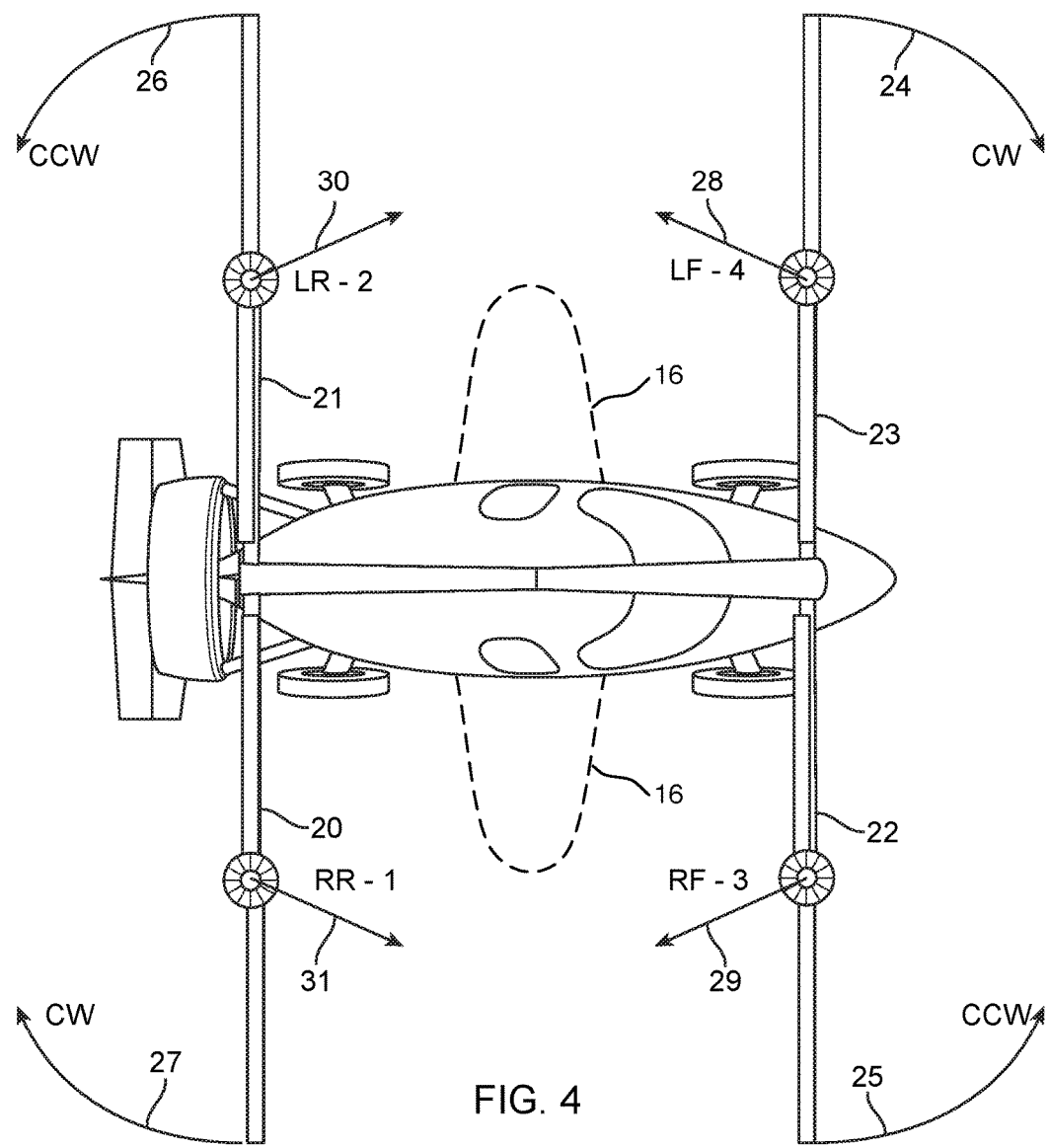
FIG. 4 shows a top view of an embodiment with indicated directions of rotation of the rotors and thrust vector enhancements for yaw control.

Protor control formulas—The joystick and collective would be used to control the RPM of the protor motors via a motor controller that would convert an RPM request to the necessary power (+ or −) to maintain the requested RPM. The formulas needed to set the RPM for some embodiments can be represented by the following pseudo-code segment:

ProtorRPM[0]=(−Pitch−Roll+Yaw+VVelColl+
    BaseColl)*MaxPM #right rear protor RPM ProtorRPM[1]=(−Pitch+Roll−Yaw+VVelColl+
    BaseColl)*MaxRPM#left rear protor RPM ProtorRPM[2]=(Pitch−Roll−Yaw+VVelColl+
    BaseColl)*MaxRPM#right front protor RPM ProtorRPM[3]=(Pitch+Roll+Yaw+VVelColl+
    BaseColl)*MaxRPM#left front protor RPM The total effect of the flight controls on the protors is represented by these four pseudo-code formulas. In FIG. 4 the array representing the RPM's requested of the individual protor motor controllers has entry 0 representing the right rear protor 20, entry 1 the left rear protor 21, entry 2 the right front protor 22 and entry 3 the left front protor 23. The values for Pitch, Roll, Yaw and VVelColl (Vertical Velocity Collective) can come directly from the flight controls after any necessary scaling, or alternatively the values can come from other algorithms that are only indirectly affected by the flight controls as a result of complex computer algorithms implementing a particular control scheme. The BaseColl term defines the amount of 'base' collective RPM needed to maintain nominal level flight at the current airspeed as determined by the flight control system.

Pitch Control—If the value of Pitch is increased positively, the RPM values of ProtorRPM[0] and ProtorRPM[1] are decreased and the RPM values of ProtorRPM[2] and ProtorRPM[3] are increased. A positive increase in pitch value will simultaneously decrease the RPM of the back protors (20,21) increase the RPM of the front protors (22, 23). The result is increased lifting thrust in the front and decreasing lifting thrust in the back, which will cause the aircraft to pitch up. Conversely, if the value of Pitch is decreased, the thrust will decrease in the front and increase in the back resulting in the aircraft pitching down. A value of zero would be equal RPMs and assuming the aircraft is in trim, no pitch.

Roll Control—Roll control is similar to pitch control except the changes in Roll value affect the protors on the left and right sides equally instead of front to back. It is easily seen that when the Roll value increases, the RPM and thus thrust of left side protors increase and the RPM and thrust of the right side protors decrease resulting in the aircraft rolling to the right. So when the joystick control is pushed to the right for a right roll, it increases a positive Roll value. Conversely, when the joystick is pushed to the left it generates an increasingly negative Roll value.

Yaw Control—Yaw control is somewhat different than roll or pitch. It relies on the fact that the protors spin in certain directions. In order to eliminate torque problems from the electric motors turning the protors, the protors are paired as counter rotating protors. So the method of generating yaw is to unbalance the torque on the protors and use the net torque to rotate the aircraft. In this embodiment, each protor turns in the opposite direction of its immediate neighbors. In this instance the rotation is as follows (see FIG. 4):

Left front protor 24—CW
Right front protor 25—CCW
Left rear protor 26—CCW
Right rear protor 27—CW If the Yaw value is positive, then from the pseudo-code formula above the left front protor and right rear protor will increase in RPM relative to the right front protor and left rear protor which will decrease in RPM. If scaled correctly the total lifting thrust will stay constant but the left front 24/right rear 27 combination will produce more RPM/thrust while the right front 25/left rear 26 combination will produce less RPM/thrust. Thus the left front/right rear combination which are rotating CCW will produce more torque that the right front/left rear combination which is turning CW at reduced torque. The result is the aircraft will have a rotational force due to the excess torque in the CCW direction. And if the Yaw value is negative, the converse will happen.

It is also possible to enhance the yaw moment by giving each protor axis a slight angle in direction of the desired yaw resulting in a thrust vector in that direction. For example see FIG. 4 in which each protor has a thrust vector 28,29,30,31 from the angle of the axis in the direction of the desired yaw. Normal pitch and roll operations as well as normal flight will result in balanced and offsetting yaw thrust vectors. However, when the above differential RPM yaw operations take place the higher RPM protors provide additional thrust in the desired yaw direction and lower RPM protors provide less thrust in the other direction. The result is an increased yaw moment at the expense of some loss of vertical thrust per protor due to a component of the protor thrust not being vertical.

Collective Control—The Vertical Velocity collective control term VVelColl provides a difference value about a given BaseColl RPM value that represents level flight. The VVelColl value can be directly proportional to the collective input control or as with the other controls can be generated by computer algorithms.

Limited Collective Control Range—The collective control use in some embodiments differ from a helicopter in that while necessary for controlling vertical takeoff and landing lift it is not required in forward flight where vertical lift is controlled by aircraft pitch. Consequently the Vertical Velocity collective control input is limited as a function of airspeed, starting at full scale at zero and becoming zero when collective vertical control is no longer needed. This also assures that electrical energy consumption from collective control use is limited.

Automatic Power Tracking Base Collective RPM—As the speed of the aircraft increases and the impact of collective protor lift is diminished and the aircraft enters the autorotation region, the BaseColl RPM value is managed by a computer algorithm to maintain a particular electrical power consumption point. So, for example, if the aircraft is in the autorotation region operating at zero net protor power, the collective can be decreased slightly by the control algorithm to lower the overall BaseColl RPM component thus providing regenerative braking and net power flow back to the battery store. In order to maintain the status quo aircraft condition (ie constant altitude or climb) the pitch of the aircraft will need to increase. This increase in pitch increases the lift of the aircraft and also the drag which provides the source of the regenerative energy. A closed loop control monitors the power and adjusts the BaseColl value to produce an RPM that over some desired period of time results in the average power level within the desired range. This technique is used if desired to recharge the energy consumed in takeoff with a relatively small amount of regenerative braking power. In some embodiments, after a standard vertical jump takeoff that consumes about 0.2 kWh of energy, the computer algorithm results in the regeneration of that energy at a rate of about 4-5 kW and the battery store is typically fully recharged in less than 3 minutes (see FIGS. 5 thru 8). The increase in aircraft pitch due to regenerative charging is about 1-2 degrees.

Figure 6:
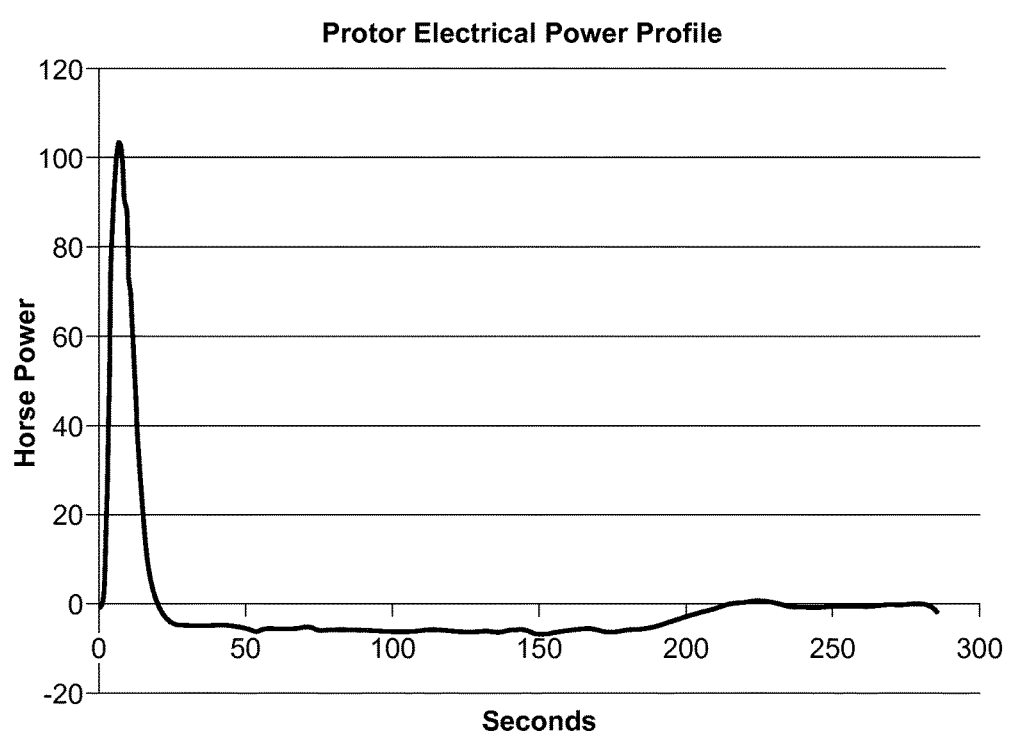
FIG. 6 shows the power profile over time during normal 'jump' vertical takeoff and subsequent managed autorotation cruise.
Figure 8:
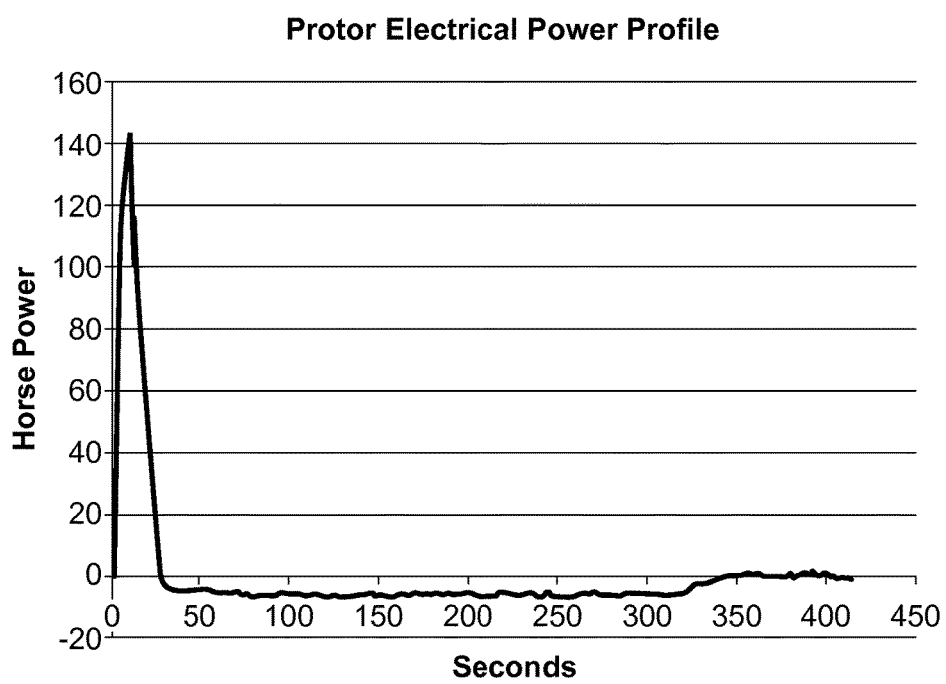
FIG. 8 shows the power profile over time during a high vertical takeoff (100' AGL) and subsequent managed autorotation regeneration.

Referring to FIG. 6 and FIG. 8, the first approximately 20 to 25 seconds of flight depicted in these graphs shows is the horse power required for vertical takeoff and transition to forward flight. Once in forward flight and operating in a power managed regime, during the interval of time where the horse power is negative (approximately 20 to 215 seconds in the flight in FIG. 6 and 25 to 325 seconds in FIG. 8), the control loop adjusts the BaseColl value to produce an RPM such that the power level is within a range for correctly recharging the batteries, replacing the energy used for vertical takeoff. After the batteries are fully recharged (after approximately 215 seconds in FIG. 6 and 325 seconds in FIG. 8), the control loop adjust the BaseColl value to produce an RPM such that the power level is within a range such that the average power while operating in the power managed regime is approximately zero so that the batteries remain fully charged during forward flight.

A Simplified Stabilized Control System

To this point some embodiments have a classical control system with Collective Control, Pitch Control, Roll Control, and Yaw Control and Throttle. This is one more control for the pilot to contend with than a normal aircraft (i.e., Collective) and one more than most helicopters where a constant RPM rotor governor control replaces the throttle. Clearly it would be desirable if the pilot workload could be reduced. In some embodiments this is accomplished by not only reducing the number of primary controls by two, but simplifying the function of the remaining controls.

In addition, a number of features of the control system design limit the operational range of the controls minimize the probability of the pilot placing the aircraft in unsafe operating regions; prevent the aircraft from entering into aerodynamically stressful conditions; and limit the possibility of pilot operations accidentally discharging the on-board electrical store.

Several functions also substantially lower the pilot skill and workload necessary to operate the aircraft including takeoffs, landings and crosswind operations and make the control behaviors consistent across all portions of the operational spectrum. Artificial aircraft stability inherent in the flight control systems flies the aircraft such that necessary pilot functions are limited to course maneuvers.

Example Pilot Controls

The primary controls used to pilot some embodiments of the aircraft are: Vertical control (was Pitch), Turn control (was Roll) and Gas Pedal/Throttle (modified behavior from normal propulsion engine Throttle). These three controls are all that are necessary to fly the aircraft successfully in all of its operating regions. A few secondary controls are added for pilot convenience and are not needed in normal operation: a Brake Pedal which is used to slow the aircraft at a faster rate—and induce regeneration; a Slip control which allows explicit sideways aircraft motion particularly at slow speed; a Cruise control which is used to lock in the current glide/climb angle and speed and allow for incremental speed changes, and a Crosswind mode selection switch which automatically aligns aircraft nose with flight path heading in a crosswind as speed and altitude decrease to a landing.

Additional Flight Control Functions—In addition to the above controls and functions, the following are also possible and implemented in some embodiments.

Limit minimum "cruise" speeds—The control system limits the minimum cruise speeds of the aircraft as a function of altitude. When at a cruising altitude the minimum airspeed speed will not be allowed to go slower than autorotation speed or if an on-board generator is present, slower than the speed that would result in negative net energy inclusive of generator capacity. This prevents accidental discharge of electrical energy from the battery store due to slower speed requiring power to rotate the protors. As altitude decreases the minimum speed also decreases allowing for appropriate approach speeds for landing and expenditure of energy from the battery store.

Limited Rate of Descent near ground—As the aircraft approaches ground level, the flight control system slows the maximum descent rate to nearly zero at zero AGL. Thus a soft vertical or conventional landing can occur with a full down vertical control position.

Protor ground control—When the aircraft lands the protors are promptly stopped in a position that facilitates egress/ingress from the aircraft. The protors remain stopped for safety and to reduce electrical consumption until the aircraft controls call for positive vertical velocity or the ground speed increases beyond a preset threshold. This also allows the positioning of the protors to be in close proximity to the top of the aircraft without concern for accidental blade strikes during ingress/egress.

Automatic Initial Control Settings

Variations in weight, center of gravity and atmospheric conditions obviously affect the operation of any aircraft. The flight control system of some embodiments adapt the response of the controls to these variable conditions over a period of time. At start up, however, the flight control system needs to start with some initial default values. The possibility exists that the actual conditions could be sufficiently different from the default assumptions as to create suboptimal control response especially on an initial vertical takeoff. For example, a center of gravity well forward of that assumed by the initial values would result in an aircraft tendency to pitch forward at takeoff. Certain data would allow the control system to create initial values that closely represent the actual conditions. By outfitting the aircraft with strain gauges or similar sensors to measure pressure on the landing gear, both the gross weight and weight distribution can be ascertained before takeoff. And atmospheric conditions are also easily obtained from aircraft instrumentation.

Automatic center of gravity thrust (pitch) adjustment on takeoff—Based on the values of the sensors the initial integration term (Ti value) in the pitch control loop is set to compensate for center of gravity variation. The result is the Pitch control is accurate without a forward or rearward pitch tendency during takeoff irrespective of the center of gravity location.

Automatic vertical velocity=0 adjustment on takeoff—The same sensor values on the landing gear can be used to also preset the initial integration (Ti value) for vertical velocity collective control loop based on the weight of the aircraft and the current atmospheric condition. The result will be the Vertical control will be more accurate at takeoff without an up or down offset bias.

Figure 9A:
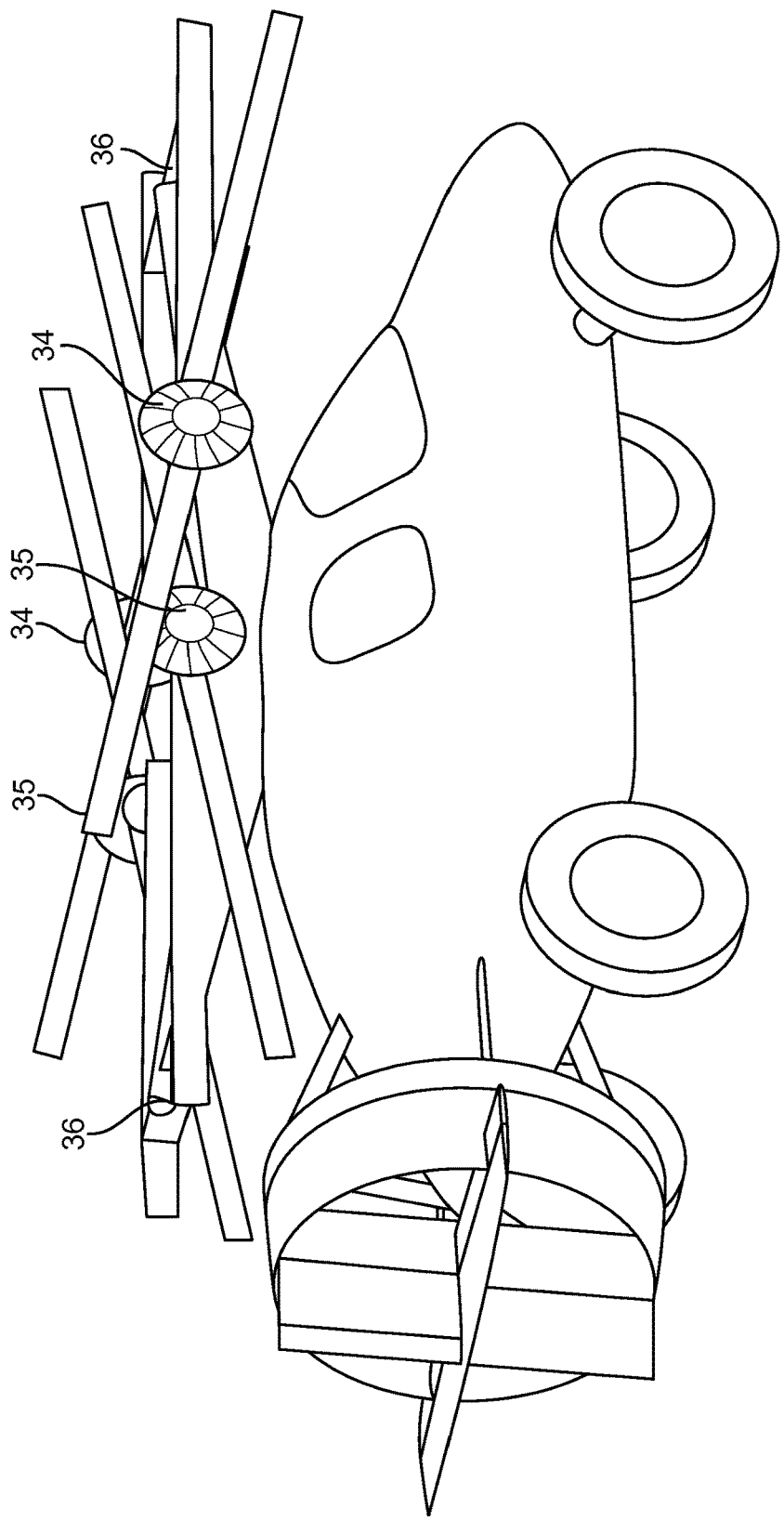
FIGS. 9A and 9B show side and top views respectively of an embodiment with rotors collapsed and stowed for ground operation.
Figure 9B:
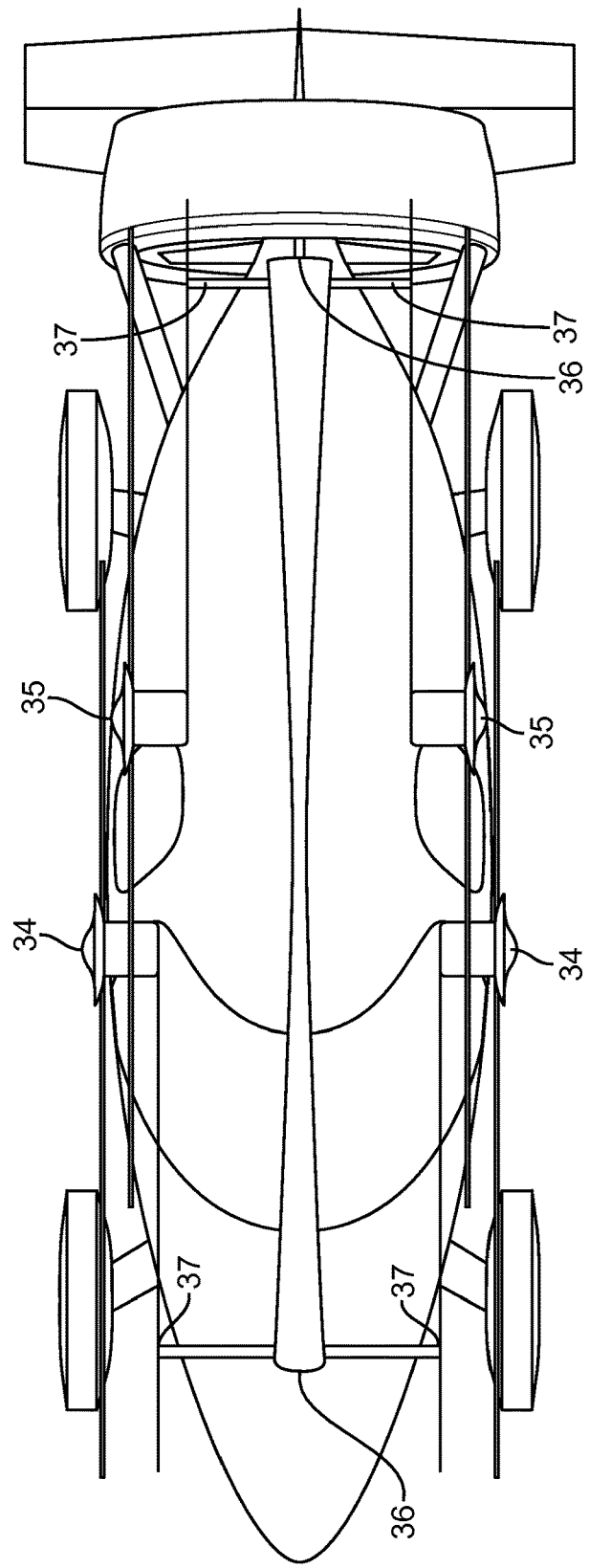

Possible Roadable Vehicle Structures—With only power and control wiring leading to the protors and with all components being light weight there are few mechanical constraints to folding protor structure in any number of possible configurations. One possible result is a compact structure with protors stowed on top of the aircraft as shown in the side view of FIG. 9A and top view of FIG. 9B. The aircraft could be easily towed, or driven by electric powered wheels, or powered by a transmission connected to the propulsion engine to allow it to be a roadable vehicle.

Electrical Power System Configuration

Redundant Motor Power Control Systems—Since the control of the aircraft depends on the presence of electrical power, the power system (as well as flight control system) of some embodiments is fully redundant. The objective is to insure if one power and/or control path fails the other will provide adequate power/control for normal flight. Vertical takeoff and landing may not be possible, but STOL operation would be. The power requirements for vertical takeoff are very significantly more than necessary for normal flight. For some embodiments with normal jump takeoff, power requirements can exceed 25 hp per protor. But for normal maneuvers in the managed autorotation regime, power seldom exceeds 1 hp per protor, with peaks of 3-4 hp per protor for extreme maneuvers. So half power still gives a wide margin for normal flight operations.

To enable power redundancy, some embodiments provide for each protor to have two separate electric motors geared together or a motor with two independent and separate windings. Each motor/winding would be driven one of the dual power systems.

On-Board Generation

In another embodiment, recovering the electrical energy expended on takeoff and landing could be accomplished with an onboard generator probably driven by the primary propulsion engine. This generator could be specific to the needs of the protor electrical system and be a protor class motor operated as a generator. Getting the right power format (ie voltage/amperage) may also require power conditioning. This approach has the advantage that it can be somewhat more efficient as it does not suffer the aeronautical losses incurred in pulling the energy out of the airstream. It does, however, still reduce the available propulsion engine power while it is operating similar to the reduced effective power from additional drag when pulling power from the airstream. Having this generator does NOT mean however that the protor motors will not need to operate as generators as well. There is still the requirement for continual braking as well as powering the protors to maintain the desired RPM for managed autorotation flight control. The additional minor efficiency gains of on-board generation for a limited portion of the flight regime needs to be traded against the additional weight and complexity of a separate generation system.

On-ground charging—In another embodiment or supplementary to any embodiment a simple approach to recharging is to plug into an external source when on the ground. The propulsion engine with generator, if present, could also be used for on-ground charging.

Power Conversion Efficiencies and Effect—The electric motor power system has very good efficiency compared to other propulsion systems, but obviously not 100%. Power drawn from the battery will also suffer a small amount of loss in transmission. But more power will be lost in the motor controller power management. In this simulation model of an embodiment a mid 90% for a good switching motor controller is assumed. Then the efficiency of the motors needs to be taken into account. Motors such as specified for this embodiment have efficiencies as high as 95% in the operating range of concern. Then conversion efficiencies for energy going the other direction—regeneration—need to be accounted for. Assuming a similar generation efficiency to motor efficiency and motor controller efficiency would make the charging path efficiency symmetric with the power path. However the efficiency of the batteries taking a charge also needs to be taken into account to determine the net energy consumed in the discharge/charge loop which for current technology batteries is on the order of 95-98%. The round trip energy from the batteries and back is the product of these efficiencies.

Flight Control System operations—The details of the flight control systems of some embodiments involve more than a dozen closed loop (feedback) controls for managing various control functions as well as a number of open loop controls. The functions and details of the major flight control components are described in more detail below.

Open Loop vs Closed Loop (Feedback) Controls—Open loop control in the aircraft control system is generally used to set estimated control axes values and/or propulsion throttle values to achieve a desired flight condition. The open loop controls are primarily a function of the current airspeed and/or engine throttle setting of the aircraft. These have usually been designed to produce a particular stable aircraft condition in nominal portion of the aircraft's operational region. For example, a trim condition for level flight at a certain airspeed and aircraft weight. These trim condition values may be a function of current throttle setting to take into account the impact of thrust and engine torque as well as a function of the airspeed to account for different lift conditions at different airspeeds. The open loop control, however, does not use information about the variances needed in trim as the result of different current conditions. That is where the closed loop feedback control comes into play. In this case, the actual flight condition is measured and fed back to a dynamic control loop that incrementally adjusts the appropriate control axes values to accomplish the desired trim. In general, the purpose for the open loop control is to provide the "coarse" control thereby reducing the required dynamic range and convergence time of the "fine" closed loop feedback control. Combinations of open loop and closed loop controls are used extensively in the flight control system of some embodiments.

Different Operational Regions for Different Control Strategies—The pilot controls are designed to act consistently across the entire operational envelope of the aircraft. So for example when the pilot indicates a heading change ('turn'), the aircraft behavior is consistent regardless of speed. To accomplish this, the control system will in many instances use one control strategy at lower speeds and a different one at higher speeds. For example, when implementing the pilot 'turn' control function at low speed, the aircraft control system predominately uses the yaw axis to accomplish the change in heading and the roll axis to adjust for any slip due to wind or other conditions. At higher speeds the reverse is true. Control of the roll axis provides a bank to achieve the turn rate and control of the yaw axis is used to keep the roll 'coordinated'—ie prevent slip.

There is a speed range in which the dominate flight control strategies transition—in a way generally imperceptible to the pilot. Several of the control strategies require separate regions of lower and higher speed control. These regions, however, may be very different for each control function. For example, in the model of some embodiments the transition speed for the low to high speed turn strategies is a narrow speed band at approximately 30 miles per hour, while the transition region for full collective vertical control to full pitch vertical control is a larger transition region from 30 mph to 85 mph in which aircraft control strategies are blended in the transition region by the flight control system.

Figure 10:
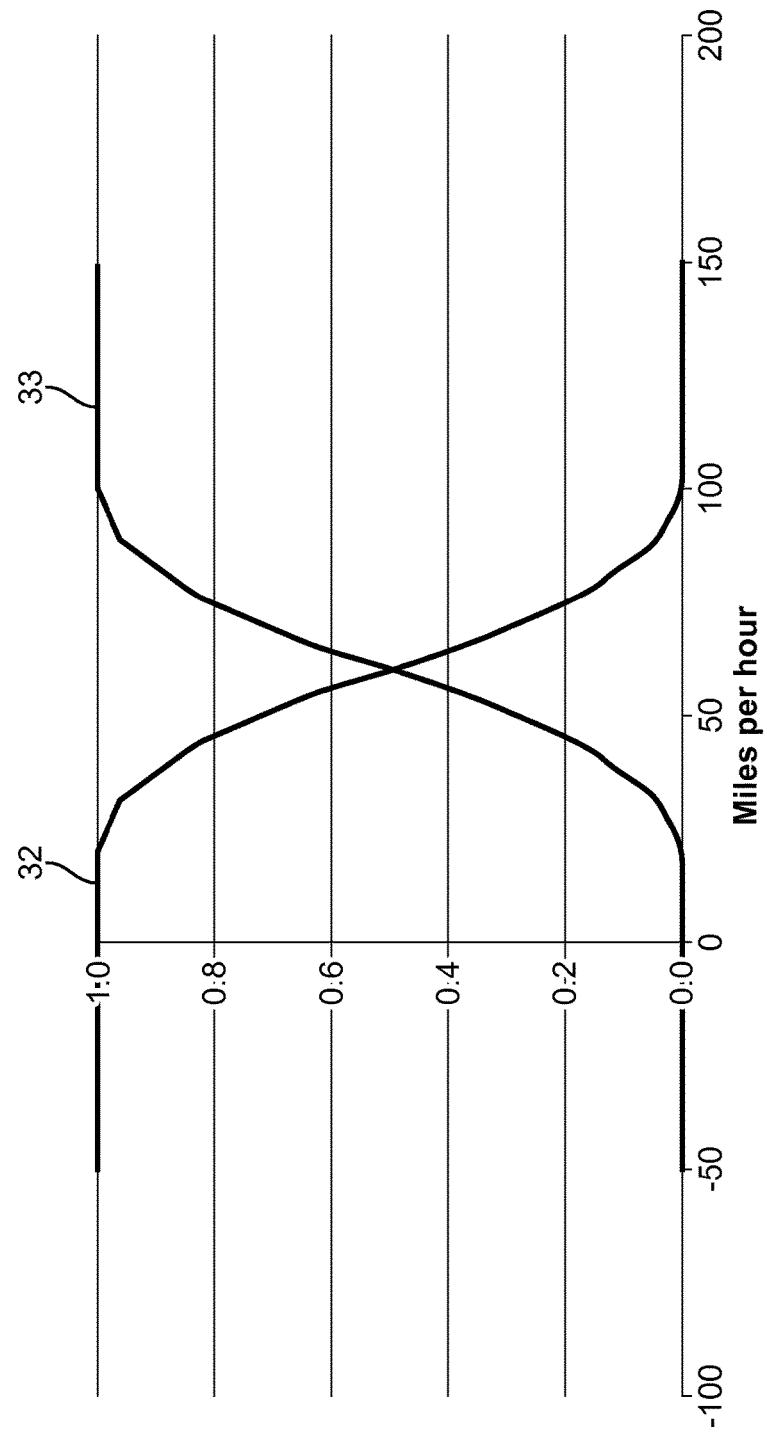
FIG. 10 shows the transition functions that control vertical control at lower and higher speeds.

Implementation and Use of Open Loop Controls—Open loop controls are determined experimentally by recording the optimal values for the aircraft control axes for the specific speed and propulsion engine throttle settings. By incorporating the measured values in an appropriate function curve for speed and/or throttle, the open loop function value at any speed/throttle condition is determined by an interpolation of the recorded curve. In the simulation model of some embodiments there are 16 distinct curves that are used to implement parametric open loop functions. Some of these functions provide values to be used directly with the control axes, mostly additive to either actual control axes values or possible other control loop values. Other open loop functions are multiplied by closed loop values to control the operational range of the function. For example, to control the transition of collective versus pitch control of vertical velocity as shown in FIG. 10 a smoothed speed based transition function from 0 to 1 33 and its inverse 32 are used to multiply the actual respective values to get the effective values for each control portion of the control strategy.

Figure 11:
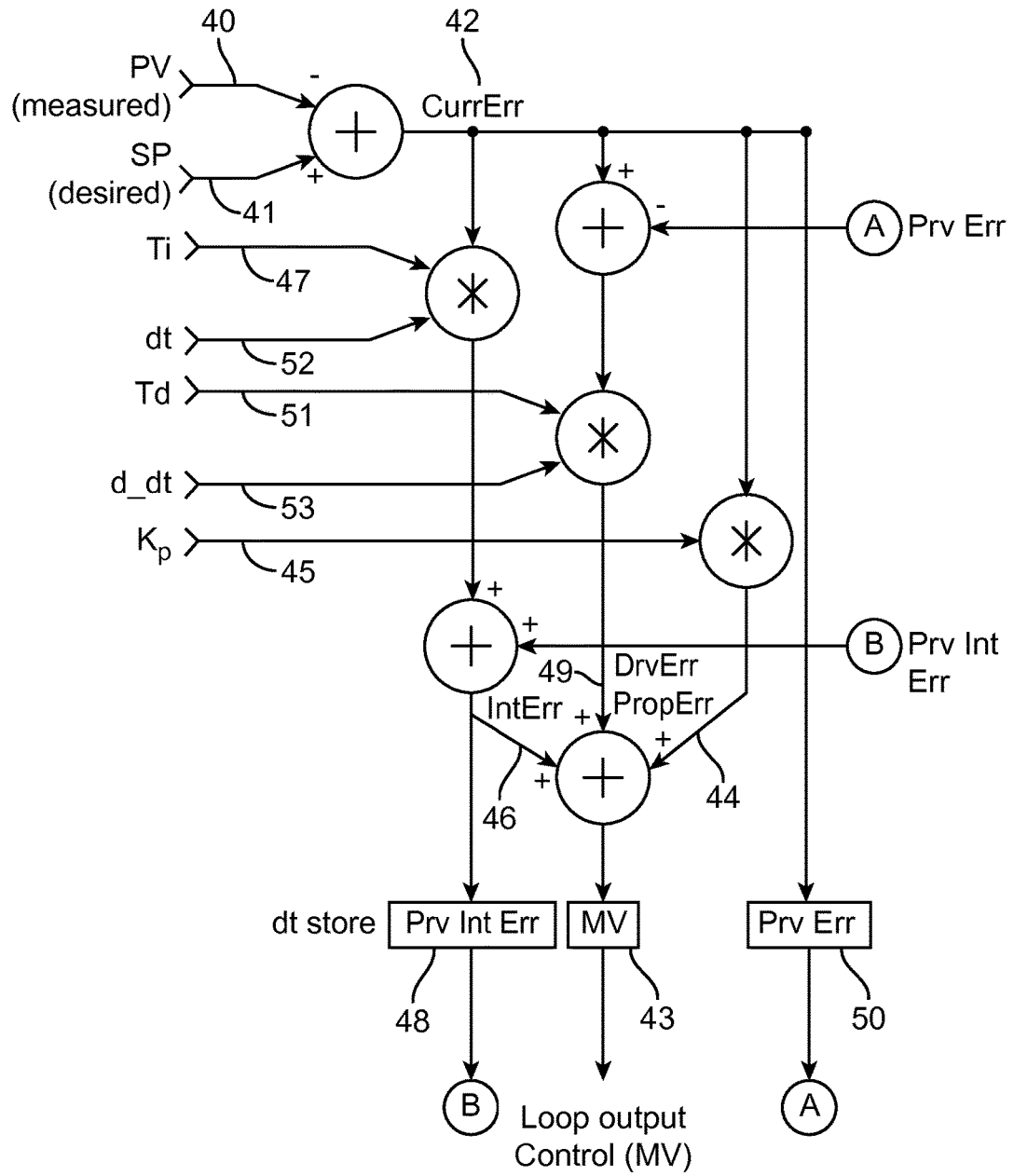
FIG. 11 show the schematic diagram for the closed loop feedback control function used in multiple instances in implementing the flight control system.

Implementation of Closed Loop Control—The closed loop control implemented is usually called a "PID" controller for the three possible types of terms that can be used to effect feedback values—Proportional, Integral and Derivative. In our implementation the closed loop controls will be described in basically the "classical" form as shown in FIG. 11. Briefly, the Proportional term will cause the output to change proportionately to the input. The Integral term will cause the output to change based on the history of past performance by using a saved (integrated) value that represents that past behavior. The Derivative term "predicts" future behavior by essentially doing a derivative on the current and immediate past behavior. It is looking for the direction of change to predict behavior.

Any flight system PID control loop may incorporate any one or more of the terms depending on the desired outcomes. For example, in the case of automatic collective RPM adjustment for power tracking the only term needed and used is the Integral term which reflects over a period of time how the average power consumption compares to our target power consumption. In any case, the general model shown in FIG. 11 describes the terms used in each control loop discussed. In the FIG. are two primary data inputs external to the control and one primary output to effect control. The input values are the Present Value (PV) 40 being measured, the desired Set Point (SP) 41 for the Present Value to be in the future. The difference between the two value is the Error Value, shown internal to the control as CurrErr 42. The objective of the control is to generate an output control Manipulated Value (MV) 43 such that CurrErr 42 will become zero. This means that the MV output control value 43 must directly or indirectly affect the PV 40 over time. Assuming the system being controlled by the MV can reach a stable point such that PV=SP, then such a control loop may work.

Determining the correct feedback components values to produce the next MV 43 is critical and can be complex. But the feedback loop calculation process itself is straightforward. The next value of the Proportional term (PropErr) 44 is determined by multiplying the CurrErr 42 by a constant, Kp 45; and the next value of the Integral term (IntErr) 46 is determined by multiplying the CurrErr 42 by a constant, Ti 47 and adding the previously saved integral value, PrvIntErr 48 (and the result is also saved as the next PrvIntErr); and the value of the Derivative term (DrvErr) 49 is determined by the difference between the current error, CurrErr and the immediately previous error, PrvErr 50, multiplied by a constant, Td 51. The sum of the PropErr, IntErr and DrvErr terms then becomes the next MV. The entire trick of getting a satisfactory control loop is determining which of the P, I, D terms are necessary or helpful and what are suitable constant values for Kd, Ti, and Td. These terms are highly dependent upon the particulars of the system under control and must usually be determined experimental. Several techniques exist to help in determining those values which is beyond the scope of this discussion.

In digital systems, these control loops are sampled at an appropriate rate to achieve the necessary corrective action of the control loop. With computer firmware control, this time interval is however not always exactly the same, so that variations in time would skew the control loop behavior. To compensate for this, the actual time of the current loop is taken into account and is shown as "dt" 52. As in a real integral the integral term is multiplied by the actual interval "dt" and the derivative term is "differentiated" by multiplying by "d_dt" 52—the inverse of "dt". If the time intervals were always exactly the same, the "dt" and "d_dt" values could be subsumed into the Ti and Td constants respectively.

Flight Control System Details—The individual control functions are described for the major functions of the flight control system, including which parametric terms are used in the control loops for those functions.

Air Speed Controls—The gas pedal/throttle along with the "cruise control" control the aircraft air speed—forward and reverse. The gas pedal/throttle is not directly connected to the propulsion engine. Rather the engine throttle is manipulated by a servo as controlled by the flight control system. The gas pedal's depression is encoded as a proportional speed request (eg, SP), not as a throttle command.

When the aircraft speed request is low (eg <10 mph) the propulsion engine is always at idle with minimum forward thrust. Speed in this region is controlled by managing the aircraft pitch fore and aft instead of propeller thrust. A closed loop control manages the pitch of the aircraft to maintain the desired speed—forward or backwards. Reverse speed is limited by the controller and is requested normally by using the "cruise control" to decrement to a negative speed. And since the gas pedal/throttle is additive to the cruise speed, the actual speed—forward or reverse—can be controlled by the gas pedal. Until the requested forward speed reaches a certain preset threshold, the engine remains at idle. When the threshold is reached the throttle control loop becomes active and an open loop function starts to limit the low speed pitch control.

Low Speed Pitch Control—Controls the pitch of the aircraft at low speeds to achieve a desired airspeed set point. This control thus maintains the aircraft pitch necessary to keep the aircraft at the desire airspeed, including stationary (speed=0)
Kp 45, Ti 47, Td 50 have constant values
PV 40=Current Airspeed
SP 41=Cruise set point+Gas Pedal value
MV 43=Pitch axis term Engine Throttle Control—The physical engine throttle is manipulated by a servo that is managed by this control loop.
Kp 45, Ti 47, Td 50 have constant values
PV 40=Current Airspeed
SP 41=Cruise set point+Gas Pedal value
MV 43=Engine throttle setting Vertical Velocity Control—Maximum positive and negative vertical velocity rates are set by parameters in the control system. The displacement of the vertical control (joystick) gives a vertical velocity set point (SP) proportional to the maximum positive or negative vertical velocity rate. Zero displacement indicates zero vertical velocity—ie level flight which is maintained by the flight control system.

The aircraft's actual vertical velocity is controlled by two closed loop controls. At low speed the vertical velocity is determined by a closed loop control manipulating a Vertical Velocity collective term to achieve the desired set point. The value of this term is added to the base collective (BaseColl) term to provide the necessary collective rate to achieve the desired vertical velocity. At high speeds, the vertical velocity is managed by a closed loop control manipulating a Vertical Pitch term to provide the desired vertical velocity set point. Between low and high speeds operating limits an open loop function blends the two control functions based on current airspeed. (FIG. 10)

VVCollective—Lower speed vertical velocity collective control loop
Kp 45, Ti 47, Td 50 have constant values
PV 40=Current Vertical Velocity
SP 41=Target Vertical Velocity
MV 43=Vertical Velocity Collective term (added to BaseCollective term)

VVPitch—Higher speed vertical velocity pitch control loop
Kp 45, Ti 47, Td 50 have constant values
PV 40=Current Vertical Velocity
SP 41=Target Vertical Velocity
MV 43=Vertical Velocity Pitch Axis term Heading—(Turn/Bank) Controls—Maximum heading change (turn/bank) rates are set by parameters in the control system. The desired heading change rate set point is determined by the proportional setting of the heading (roll) control. If no heading change is indicated, the current heading will be maintained by the flight control system.

The actual aircraft's heading is controlled by four closed loop controls. At low speed, heading is controlled by closed loop feedback manipulation of a yaw term while slip is kept to zero (unless slip control is active) by a closed loop manipulation of a roll term. At high speeds the roles are reversed and heading is controlled by a closed loop control of a roll term while a closed loop control of a yaw term prevents slip and assures a coordinated turn. An open loop function provides the transition between low and high speed heading control dominance based on current airspeed.

LS Heading—Turn/Yaw—Low speed yaw heading control
Kp 45, Td 50 have constant values
PV 40=Current Hdng Yaw Rate
SP 41=Target heading change rate
MV 43=Yaw axis term LS Heading—Slip/Roll—Low speed slip (sideways motion) control
Kp 45, Td 50 have constant values
PV 40=Current Side speed
SP 41=Target side speed (normally 0)
MV 43=Roll axis term HS Heading—Turn/Roll—Higher speed roll heading control
Kp 45, Td 50, Ti 47 have constant values
PV 40=Current heading roll rate,
SP 41=Target heading change rate
MV 43=Roll axis term HS Heading—Slip/Yaw—Higher speed slip control to insure coordinated turns
Td 50 has constant value
PV 40=Current Side Speed
SP 41=Target side speed (normally 0)
MV 43=Yaw axis term Protor Power/RPM Controls—The protor motors are controlled by a closed loop control that manipulates the motor power controls (throttles) to match the desired RPM requested by the flight control system to effect all flight control operation. The control loop minimizes the differences in RPM value between the desired value and actual value by adjusting the throttle as determined by the RPM error.

RPM to Power—Closed loop control motor control, one per motor.
Kp 45 has constant value
PV 40=Current RPM
SP 41=Target RPM
MV 43=Protor motor throttle (power)

Protor Average Power Control—In order to keep the overall energy consumption effectively zero over time, the flight control system must control the overall average power consumed and generated by the protors. The power consumption is managed by a feedback control loop that operates past a certain airspeed where sustaining autorotation is guaranteed and/or on-board generation capacity is not exceeded. In this aircraft the airspeed is 70 mph. The TargetPower value is either the regenerative power rate desired (4-5 kW here) or zero power if no regeneration is needed. The CurrAvgPower is averaged over a period of time. TargetPower power is compared to CurrAvgPower and the difference (PwrDiff) is multiplied by a gain constant (Kdiff) that results in adding an increment or decrement to the current Base Collective RPM to create a new Base Collective RPM. The Base Collective RPM request to the motor controller will result in a corresponding change in the power, which will affect the Curr Avg Power. The time constant on this loop is relatively long (~10-20 sec) so that flight maneuvers are smoothed out.

Autopower to Collective—Closed loop to control the base collective RPM term to produce the desired average power. This could be a regenerative power level or a zero power level.

Ti 47 has constant value
PV 40=Current Average Power
SP 41=Target Average Power
MV 43=Base Collective RPM term Continuously powered RPM control—In the managed autorotation system of some embodiments, the protors are under constant control all the time—not just at powered lift takeoff and landing. Most rotary wing aircraft use high inertia rotors for a number of reasons. One of which is to insure the rotary wing RPM will not rapidly change under different rotor angle of attack/drag conditions. If the angle of attack of the rotor blade increases there is additional positive rotational torque imparted to the shaft which tends to increase the RPM. And conversely with a decrease in angle of attack. In this embodiment, managing the RPM of the protors is key to providing the appropriate lift of each protor to effect the necessary flight control. When the attitude of the aircraft changes, for example, the angle of attack of the protors can also change. It is not desirable to have the RPM's fluctuate due to aircraft orientation as it will also change the lift in ways difficult to predict and manage. But since the protors in this aircraft are low inertia to allow rapid RPM change by the motors for flight control operations, the motors will also be used to maintain the desired RPM's in the face of changing aerodynamic conditions. The motors are always braking/generating or accelerating/consuming energy and are not in zero shaft power autorotation except in passing from one region to another.

Collective/Control Input RPM limits—There are a number of control system boundary conditions that are necessary to insure safe operation such as limiting the range of the Base Collective RPM. The maximum Base Collective RPM is limited to a fraction of the total MaxRPM so that there is headroom for the Pitch/Roll/Yaw control inputs to have effect without bumping into MaxRPM conditions. In some embodiments the Base Collective RPM limit is currently 90 percent of MaxRPM. In addition, there is a lower limit for Base Collective RPM to prevent the protors from losing lift in flight and again allow headroom of control input effect. Each individual control axis also is scaled—typically to 20-30 percent of maximimum RPM—to limit its allowed RPM delta thus determining the magnitude of the effect of each axis.

Protor power requirements—Protors require maximum power for high rise vertical take offs. In normal cruise flight however the instantaneous actual (differential) power required for protors to execute all necessary flight maneuvers is on the order of 5-10% of the peak power.

Many variations possible—The specifics of the control functions are only illustrative of how this is implemented in one instance. In other embodiments, alternative equivalent control methods to accomplish the same ends can be used.

UAV Control Option—Since the flight control system is totally computer controlled fly-by-wire, the option to operate remotely as a UAV would require a set of aircraft controls, a data link and one or more cameras. Indeed flying the aircraft in the simulator is effectively the same as flying it as a UAV with remote cameras for orientation.

Emergency control system—A number of unanticipated conditions could occur as result of failure of aircraft components. Control system modes can be implemented to compensate for a number of these potential failures. The primary objective is to guarantee that no single failure will bring the aircraft down catastrophically. Possible failures could include: loss of flight control system, loss of electric power, loss of propulsion engine, loss of fuel, failure of a battery, failure of a motor/generator and probably most catastrophic—loss of a protor. Some potential solutions are addressed below.

Safe flight/landing requirements—If a failure occurs and continued normal flight to the nearest safe landing is not possible, then it is highly desirable that what flight is left be controllable and that landing is possible at slowest possible speed and at a minimum descent rate. While desirable, a soft vertical landing is not required. In descriptions below "continued flight" implies that the aircraft with the appropriate control system should be flyable to the nearest safe destination. The term "landing" only implies a landing spot needs to be found as soon as possible as the aircraft cannot sustain flight but is controllable.

Continued flight/landing with loss of a redundant flight control function/power system—In a fully redundant system, including power systems, failure of a single control system would still leave the redundant control system to fly the aircraft. One skilled in the art of redundant systems could design such a system with automatic monitoring and fallback provisions.

Continue flight/landing with reduced protor power due to a single power control/motor failure in redundant system—In the case of failure of any power element in a redundant motor/protor drive system would again leave the remaining redundant path power system intact. A simple algorithm is in which if one element of a one branch of the dual power system fails then all the other elements of that system are disabled (ie, idled). That would leave the remaining half of the dual system with sufficient power for normal flight and probably even soft vertical landing but probably not vertical takeoff.

Landing with no propulsion engine power (no fuel/engine seize) and/or empty batteries—Consider the combination of two bad cases where the main propulsion engine loses power and there is little or no battery power available, but the control and power electronics function on at least one of the two redundant systems. Despite no battery reserves the flight control system will manage the power on the protors to allow safe descent and landing by drawing necessary power from the airstream. In this case of course the aircraft is coming down and need to find nearby place to land. If the batteries are functional but drained the descent can even provide some energy recapture from the braking to allow a softer slower landing. At a minimum landing can be at a low speed controlled descent as the protors basically autorotate under control.

Landing without any electric motor control (free autorotation of all protors)—Suppose all power and control is lost for all protor motors but they are free-wheeling and autorotating. If a particular embodiment has active control surfaces, the flight control system would have sufficient control to fly the aircraft albeit in a more limited flight regime. This has been successfully demonstrated in a simulation of an embodiment with active control surfaces.

Continued flight/landing without a single protor due to locked up motor/gear or damaged and stopped or "missing" protor—This is probably the most fearful of the potential failure modes. If a protor is lost from a devastating giant bird hit in-flight or some other calamity, the situation could be fatal. But there are design approaches that can mitigate a single protor failure in-flight and the flight control system can operate in a failure recover mode to reconFIG. the use of the remaining protors and tail surfaces if present. Different algorithms may be possible for different configurations, but the following two will illustrate how this can be done.

Four protor system with active tail control surfaces—In the four protor embodiment, the normal flight operation is for the tail surfaces to be inactive and act as stabilizing trim surfaces—unless there is an emergency. There are at least two emergency cases where appropriate active tail control surfaces can help. First is the one mentioned previously when all protors are freely autorotating without control or power. The second is when a protor is out. In that case, the control system disables (hard stops) the offending protor and stops at least temporarily the other protor diagonally across from it. The result is that the remaining two rotors balance the aircraft in lift, but not in yaw. In some embodiments, in forward flight, both the elevons and rudder are used to compensate for the yaw torque produced by the remaining two protors which are rotating the same direction. The third protor can also be used by the flight control system differentially to help stabilize the aircraft. Both the rudder and elevon motions are much more exaggerated than would be present in normal aircraft operation to get the necessary aerodynamic control. This has been demonstrated in the simulator of the model.

Six protor as 3 coaxial pairs in a Y configuration—As shown in FIG. 3 this configuration has 3 stacks 60,61,62 of 2 coaxial protors each. In this example they are balanced in terms of their lift on the aircraft with two stacks on the side fore of the center of gravity and one in the back at 2× the distance from the center of gravity. This exact configuration is not necessary, as the two protor stacks on the sides could, for example, be of larger diameter and provide more lift allowing the back protor stack to be further yet from the center of gravity and smaller. Similar configurations with a reverse Y or all lift being from the side stacks are also possible.

In this case, the algorithm for flight control adjustment for a failure of this type of configuration is quite simple. If one of the four front protors in protor stacks 60 or 61 fails, the flight control system will immediately stop its coplanar protor that is rotating in the opposite direction and then half the lift coefficients for the back stack 62 of plane protors. The aircraft would thus have one half the maximum lifting thrust. The aircraft will be able to fly normally as verified on the simulator for the model of this embodiment as the flight control system adjusts for the needed increase in thrust from the remaining protors. A problem could occur if this event happened during vertical takeoff. In which case there may be insufficient thrust to complete the vertical rise and the aircraft could sink slowly to the ground. If possible an increase in forward speed could provide sufficient translational lift to keep the aircraft airborne.

In the remaining case where one of the protors on the rear coaxial stack 62 would fail, the remaining rear protor would continue to provide full lift, but the front protor stacks 60,61 would reduce their lift by one-half. This would be done by having the two protors rotating in the same direction as the remaining rear protor reduce their thrust coefficient to one-quarter of normal and the thrust coefficients of the two protors turning in the opposite direction reduced to three-quarters of normal. The result again would be an aircraft with half maximum lift thrust and balanced yaw but otherwise quite flyable. It should be noted that in the simulated model of this embodiment, one-quarter thrust coefficient is about one-half the RPMs and three-quarter thrust coefficient is about 85 percent of the RPMs.

By extension, it is obvious that an eight protor system with 4 coaxial stacks would behave similarly. Other configurations of 6 or more that are not coaxial may well also allow dynamic in-flight control system adjustment, but this has not been examined.

Cataclysmic failure—A ballistic parachute is a proven failsafe method used with a number of civilian and amateur aircraft. Any embodiment would be wise to have such a failsafe alternative. In embodiments designed to deploy the ballistic parachute, the flight control system can (attempt to) 'instantaneously' stop all protor motors using max power to prevent entanglement with the parachute system.

What is claimed is:
1. An aircraft comprising:
a fuselage;
at least one propulsion engine coupled to the fuselage, wherein the propulsion engine is configured to provide forward thrust to propel the aircraft along a first vector during forward flight;
a plurality of rotors coupled to the fuselage, wherein
each rotor of at least two of the plurality of rotors is coupled to a motor configured to supply power to that rotor and configured to draw power from that rotor, and
at least two of the plurality of rotors are configured to operate during a first time interval of non-descending forward flight; and
a flight control system configured to control the rotors that are configured to operate during the first time interval of non-descending forward flight in a power managed regime in which an average net electrical power, which is a net electrical power consisting of a difference between the sum of the power being supplied to each rotor by the coupled motor and the sum of the power being drawn from each rotor by the coupled motor averaged over the first time interval, is maintained within a range by a feedback control system of the flight control system, where, within the range in which the average net electrical power is maintained, an airflow power supplied to the plurality of rotors from air flow through the rotors due to air speed produced by the forward thrust provided by the propulsion engine provides most of a total lift to the aircraft along a second vector.

2. The aircraft of claim 1, wherein all of the plurality of rotors that are configured to operate during forward flight are collectively configured to provide attitude control for the aircraft.

3. The aircraft of claim 2, wherein the attitude control is provided, during the first time interval, by supplying power to or drawing power from each of the plurality of rotors that are configured to operate during the first time interval under control of the flight control system.

4. The aircraft of claim 3, wherein the attitude control is provided by (1) supplying power to at least one of the plurality of rotors from the coupled motor, and (2) drawing power from at least one of the plurality of rotors to the coupled motor.

5. The aircraft of claim 2, wherein the plurality of rotors includes at least four rotors.

6. The aircraft of claim 2, wherein the flight control system is configured for unmanned operation.

7. The aircraft of claim 2, wherein the net electrical power drawn from the rotors is maintained within a range for charging one or more batteries in the power managed regime.

8. The aircraft of claim 7, wherein the net electrical power drawn from the rotors is used to replenish the electrical power supplied by the one or more batteries for vertical takeoff or vertical landing.

9. The aircraft of claim 2, wherein the net electrical power is maintained such that the average net electrical power over the first time interval, for all of the plurality of rotors that are configured to operate during forward flight, is zero.

10. The aircraft of claim 2, wherein the net electrical power and the aircraft attitude are collectively maintained during at least the first time interval of non-descending forward flight in the power managed regime to increase a value of at least one characteristic relative to the value of that characteristic outside of the power managed regime, where the characteristic is selected from the group consisting of: (1) a fuel efficiency of the aircraft, (2) a forward speed along the first vector relative to the fuel efficiency of the aircraft, and (3) the forward speed along the first vector when the average net electrical power is maintained such that the average net electrical power over a time interval is zero.

11. The aircraft of claim 10, wherein at least one electrical generator powered by the at least one propulsion engine provides the net electrical power necessary to operate at the increased fuel efficiency or the increased forward speed.

12. The aircraft of claim 2, wherein the rotors are fixed pitch.

13. The aircraft of claim 12, wherein the power being supplied to or drawn from each rotor by the coupled motor adjusts a rotation frequency of the rotor to provide attitude control.

14. The aircraft of claim 13, wherein the flight control system imposes limits on the minimum and maximum average rotation frequency of the rotors to provide headroom for configuring the rotation frequency of each rotor for attitude control.

15. The aircraft of claim 2, wherein the rotors have variable pitch.

16. The aircraft of claim 15, wherein the power being supplied to or drawn from each rotor by the coupled motor is managed by increasing or decreasing a blade pitch of each rotor to provide attitude control.

17. The aircraft of claim 15, wherein the rotors vary in pitch as a function of angular position of the rotors.

18. The aircraft of claim 2, wherein the flight control system provides at least three axes of attitude control, including: a pitch axis, a roll axis, and a yaw axis.

19. The aircraft of claim 2, wherein input to the flight control system includes one or more of heading turn rate, vertical rate of change, and forward or reverse speed, and the flight control system manages the propulsion power and the attitude of the aircraft within predetermined safe operating flight regions of the aircraft and based on the input.

20. The aircraft of claim 19, wherein in response to input to change heading, the flight control system predominantly uses the yaw axis to change heading and use the pitch axis to prevent slip when below a low forward speed threshold, and predominantly uses the roll axis to change heading and uses the yaw axis to prevent slip when above a high forward speed threshold, and uses a combination of the yaw axis and the roll axis to change heading and prevent slip when the forward speed is between the low forward speed threshold and the high forward speed threshold.

21. The aircraft of claim 19, wherein in response to an additional input to the flight control system to change altitude, the flight control system predominantly uses the net electrical power to the rotors to change altitude when below a low forward speed threshold, and predominantly uses the pitch axis to change altitude when above a high forward speed threshold, and uses a combination of the net electrical power to the rotors and the pitch axis to change altitude when the forward speed is between the low forward speed threshold and the high forward speed threshold.

22. The aircraft of claim 19, wherein the flight control system controls the aircraft to maintain straight and level flight at a constant speed when there is no input to the flight control system, regardless of the current aircraft orientation or speed.

23. The aircraft of claim 19, wherein input to the flight control system provides for lateral direction control during vertical takeoff or landing or slip control during forward flight.

24. The aircraft of claim 2, wherein a fixed rudder fin provides additional yaw stability in forward flight.

25. The aircraft of claim 2, wherein a rudder provides additional yaw control in forward flight.

26. The aircraft of claim 25, wherein the rudder provides yaw control upon the failure of one or more of the rotors.

27. The aircraft of claim 26, wherein an elevator or elevons provide pitch control upon the failure of one or more of the rotors.

28. The aircraft of claim 2, wherein the flight control system continues to provide attitude control upon the failure of one or more of the rotors by collectively managing the electrical power to each rotor by the coupled motor to compensate for the failed rotor or rotors.

29. The aircraft of claim 2, wherein a rudder and an elevator provide attitude control upon a failure of an electrical system that provides electrical power to each rotor by the coupled motor, or a failure of the flight control system.

30. The aircraft of claim 28, wherein the flight control system notifies a user of the failure for the purpose of initiating a safe landing.

31. The aircraft of claim 30, wherein the flight control system notifies the user if a vertical landing is possible as a result of the failure or if a landing with forward speed is required.

32. The aircraft of claim 2, wherein there are a plurality of flight control systems, each individually capable of providing attitude control and each having the ability to make a safe landing upon failure of at least one of:
a rotor,
the propulsion engine,
the flight control system,
one or more electrical systems that supply power to or draw power from each rotor by the coupled motor, or
one or more batteries.

33. The aircraft of claim 32, wherein attitude control and the ability to make a safe landing in forward flight is maintained after a failure of all batteries wherein electrical power for the flight control system is supplied by the rotors by their motors.

34. The aircraft of claim 2, wherein two motors are coupled to each rotor that is configured to operate during forward flight, and a first electrical system is configured to supply power to or draw power from each rotor by a first of the coupled two motors, and a second electrical system is configured to supply power to or draw power from each rotor by a second of the coupled two motors, and the flight control system manages power supplied to or drawn from all of the plurality of rotors that are configured to operate during forward flight through either or both of the electrical systems to provide attitude control for the aircraft.

35. The aircraft of claim 2, wherein prior to takeoff of the aircraft, the flight control system uses input from at least one sensor to determine at least one of (1) atmospheric conditions or (2) the aircraft weight and balance, and to configure the plurality of rotors for level takeoff.

36. The aircraft of claim 2, wherein a structure supporting the plurality of rotors is configured to fold such that the resulting overall size of the aircraft is sufficiently small in size to drive directly on a public road or to be towed on a trailer over a public road.

37. The aircraft of claim 1, wherein at least two of the plurality of rotors are used for vertical takeoff or vertical landing.

38. The aircraft of claim 37, wherein at least one battery provides electrical power for vertical takeoff or vertical landing.

39. The aircraft of claim 38, wherein at least one electrical generator powered by the at least propulsion engine provides at least a portion of the electrical power for vertical takeoff or vertical landing.

40. The aircraft of claim 1, wherein the flight control system is configured to control the rotors that are configured to operate during the first time interval of non-descending forward flight in the power managed regime such that: (1) the average net electrical power is zero or negative such that a total average electrical power drawn from one or more rotors is greater than or equal to a total average electrical power supplied to any rotors; or (2) the average net electrical power is positive such that a total average electrical power supplied to one or more rotors is greater than a total average electrical power drawn from any rotors, and the average net electrical power is less than an average airflow power supplied to the plurality of rotors from air flow through the rotors due to air speed produced by the forward thrust provided by the propulsion engine over the first time interval.

41. The aircraft of claim 1, wherein the first vector is substantially perpendicular to a force of gravity acting on the aircraft.

42. The aircraft of claim 41, wherein the second vector is substantially parallel to the force of gravity acting on the aircraft.

43. The aircraft of claim 1, further comprising at least one pair of wings coupled to the fuselage and configured to provide lift to the aircraft along the second vector.

44. A method for operating an aircraft, the method comprising:
operating at least one propulsion engine coupled to a fuselage to provide forward thrust to propel the aircraft along a first vector during forward flight;
operating a plurality of rotors coupled to the fuselage, wherein
each rotor of at least two of the plurality of rotors is coupled to a motor configured to supply power to that rotor and configured to draw power from that rotor, and
at least two of the plurality of rotors are configured to operate during a first time interval of non-descending forward flight; and
operating a flight control system to control the rotors that are configured to operate during the first time interval of non-descending forward flight in a power managed regime in which an average net electrical power, which is a net electrical power consisting of a difference between the sum of the power being supplied to each rotor by the coupled motor and the sum of the power being drawn from each rotor by the coupled motor averaged over the first time interval, is maintained within a range by a feedback control system of the flight control system, where, within the range in which the average net electrical power is maintained, an airflow power supplied to the plurality of rotors from air flow through the rotors due to air speed produced by the forward thrust provided by the propulsion engine provides most of a total lift to the aircraft along a second vector.

45. The aircraft of claim 1, wherein the aircraft does not have any wings coupled to the fuselage that are configured to provide more than half of the total lift to the aircraft along the second vector during the first time interval of non-descending forward flight.

46. The aircraft of claim 1, wherein the first time interval is at least 300 seconds.

47. The method of claim 44, wherein all of the plurality of rotors that are configured to operate during forward flight are collectively configured to provide attitude control for the aircraft.

48. The method of claim 47, wherein the attitude control is provided, during the first time interval, by supplying power to or drawing power from each of the plurality of rotors that are configured to operate during the first time interval under control of the flight control system.

49. The method of claim 47, wherein the net electrical power drawn from the rotors is maintained within a range for charging one or more batteries in the power managed regime.

50. The method of claim 49, wherein the net electrical power drawn from the rotors is used to replenish the electrical power supplied by the one or more batteries for vertical takeoff or vertical landing.

51. The method of claim 47, wherein the net electrical power is maintained such that the average net electrical power over the first time interval, for all of the plurality of rotors that are configured to operate during forward flight, is zero.

52. The method of claim 47, wherein the net electrical power and the aircraft attitude are collectively maintained during at least the first time interval of non-descending forward flight in the power managed regime to increase a value of at least one characteristic relative to the value of that characteristic outside of the power managed regime, where the characteristic is selected from the group consisting of: (1) a fuel efficiency of the aircraft, (2) a forward speed along the first vector relative to the fuel efficiency of the aircraft, and (3) the forward speed along the first vector when the average net electrical power is maintained such that the average net electrical power over a time interval is zero.

53. The method of claim 47, wherein the flight control system provides at least three axes of attitude control, including: a pitch axis, a roll axis, and a yaw axis.

54. The method of claim 47, wherein input to the flight control system includes one or more of heading turn rate, vertical rate of change, and forward or reverse speed, and the flight control system manages the propulsion power and the attitude of the aircraft within predetermined safe operating flight regions of the aircraft and based on the input.

55. The method of claim 54, wherein in response to input to change heading, the flight control system predominantly uses the yaw axis to change heading and use the pitch axis to prevent slip when below a low forward speed threshold, and predominantly uses the roll axis to change heading and uses the yaw axis to prevent slip when above a high forward speed threshold, and uses a combination of the yaw axis and the roll axis to change heading and prevent slip when the forward speed is between the low forward speed threshold and the high forward speed threshold.

56. The method of claim 54, wherein in response to an additional input to the flight control system to change altitude, the flight control system predominantly uses the net electrical power to the rotors to change altitude when below a low forward speed threshold, and predominantly uses the pitch axis to change altitude when above a high forward speed threshold, and uses a combination of the net electrical power to the rotors and the pitch axis to change altitude when the forward speed is between the low forward speed threshold and the high forward speed threshold.

57. The method of claim 54, wherein the flight control system controls the aircraft to maintain straight and level flight at a constant speed when there is no input to the flight control system, regardless of the current aircraft orientation or speed.

58. The method of claim 54, wherein input to the flight control system provides for lateral direction control during vertical takeoff or landing or slip control during forward flight.

59. The method of claim 47, wherein two motors are coupled to each rotor that is configured to operate during forward flight, and a first electrical system is configured to supply power to or draw power from each rotor by a first of the coupled two motors, and a second electrical system is configured to supply power to or draw power from each rotor by a second of the coupled two motors, and the flight control system manages power supplied to or drawn from all of the plurality of rotors that are configured to operate during forward flight through either or both of the electrical systems to provide attitude control for the aircraft.

60. The method of claim 44, wherein the flight control system is configured to control the rotors that are configured to operate during the first time interval of non-descending forward flight in the power managed regime such that: (1) the average net electrical power is zero or negative such that a total average electrical power drawn from one or more rotors is greater than or equal to a total average electrical power supplied to any rotors; or (2) the average net electrical power is positive such that a total average electrical power supplied to one or more rotors is greater than a total average electrical power drawn from any rotors, and the average net electrical power is less than an average airflow power supplied to the plurality of rotors from air flow through the rotors due to air speed produced by the forward thrust provided by the propulsion engine over the first time interval.

61. The method of claim 44, wherein the first time interval is at least 300 seconds.

* * * * *